United States Patent
Hiramatsu et al.

(10) Patent No.: US 9,412,212 B2
(45) Date of Patent: *Aug. 9, 2016

(54) UNEXPECTEDNESS PREDICTION SENSITIVITY DETERMINATION APPARATUS

(71) Applicant: NISSAN MOTOR CO., LTD., Yokohama-shi, Kanagawa (JP)

(72) Inventors: Machiko Hiramatsu, Yokosuka (JP); Takashi Sunda, Sagamihara (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 6 days.

This patent is subject to a terminal disclaimer.

(21) Appl. No.: 14/384,493

(22) PCT Filed: Mar. 12, 2013

(86) PCT No.: PCT/JP2013/001625
§ 371 (c)(1),
(2) Date: Sep. 11, 2014

(87) PCT Pub. No.: WO2013/136778
PCT Pub. Date: Sep. 19, 2013

(65) Prior Publication Data
US 2015/0042463 A1   Feb. 12, 2015

(30) Foreign Application Priority Data
Mar. 16, 2012   (JP) .................... 2012-060435

(51) Int. Cl.
*B60Q 1/00* (2006.01)
*G07C 5/08* (2006.01)
(Continued)

(52) U.S. Cl.
CPC .............. *G07C 5/085* (2013.01); *B60W 40/09* (2013.01); *G08G 1/0112* (2013.01); *G08G 1/0129* (2013.01); *G08G 1/164* (2013.01); *B60W 2540/22* (2013.01)

(58) Field of Classification Search
CPC ...... B60K 35/00; B60W 50/14; B60W 30/09; B60W 30/08; G08G 1/0112; G08G 1/0141; G08G 1/0133
USPC .................. 340/439, 459; 701/420, 1, 119
See application file for complete search history.

(56) References Cited

U.S. PATENT DOCUMENTS 6,161,071 A * 12/2000 Shuman ........... G08G 1/096888
340/436
6,438,432 B1   8/2002 Zimmermann et al.
(Continued)

FOREIGN PATENT DOCUMENTS

JP   2005-055987 A   3/2005
JP   2006-209333 A   8/2006
(Continued)

OTHER PUBLICATIONS

U.S. Patent Application No. Unknown, with the title Unexpectedness Prediction Sensitivity Determination Apparatus and inventors Machiko Hiramatsu et al.

*Primary Examiner* — Jack K Wang
(74) *Attorney, Agent, or Firm* — Young Basile Hanlon & MacFarlane, P.C.

(57) ABSTRACT

An unexpectedness prediction sensitivity determining apparatus determines, for each of temporary stop intersections, a standard driving operation level of a driver when entering the each of temporary stop intersections, based on intersection travel information received from plural vehicles. Subsequently, the unexpectedness prediction sensitivity determining apparatus determines the unexpectedness prediction sensitivity of the driver when entering the temporary stop intersection based on the intersection travel information associated with the temporary stop intersections where determined standard driving operation levels of the drivers are identical to one another.

8 Claims, 12 Drawing Sheets

(51) Int. Cl.
*G08G 1/01* (2006.01)
*G08G 1/16* (2006.01)
*B60W 40/09* (2012.01)
*G05D 1/00* (2006.01)
*G06G 7/70* (2006.01)

(56) References Cited

U.S. PATENT DOCUMENTS

| | | |
|---|---|---|
| 2007/0027583 A1 | 2/2007 | Tamir et al. |
| 2009/0082917 A1 | 3/2009 | Adachi |
| 2009/0091439 A1* | 4/2009 | Sekiyama .......... G01C 21/3697 340/459 |
| 2010/0049429 A1 | 2/2010 | Lee |
| 2013/0338914 A1* | 12/2013 | Weiss ................. G08G 1/09626 701/465 |

FOREIGN PATENT DOCUMENTS

| | | |
|---|---|---|
| JP | 3882541 B2 | 2/2007 |
| JP | 2009-070145 A | 4/2009 |
| JP | 2013-095291 A | 5/2013 |

* cited by examiner

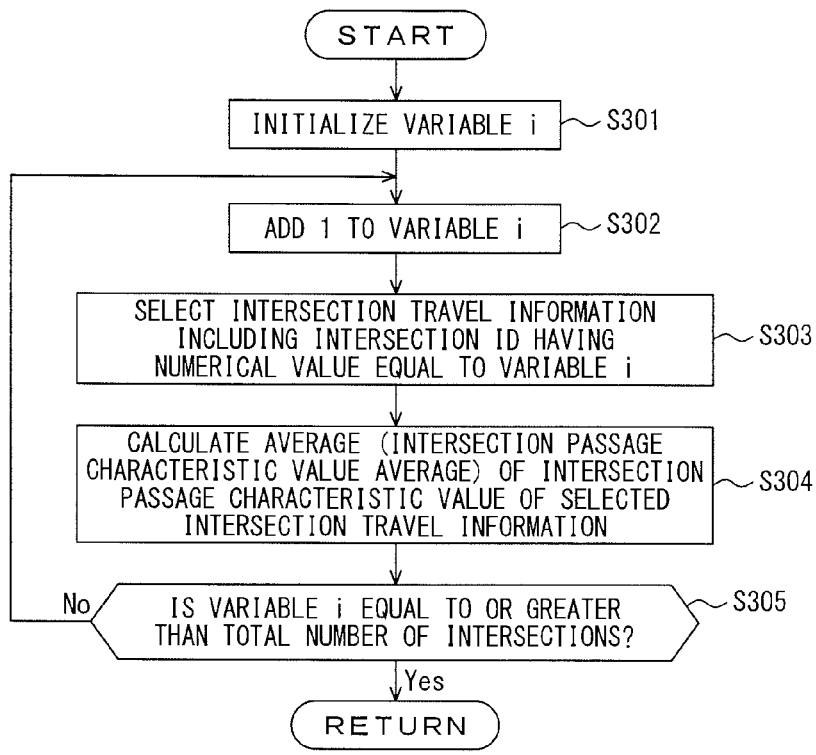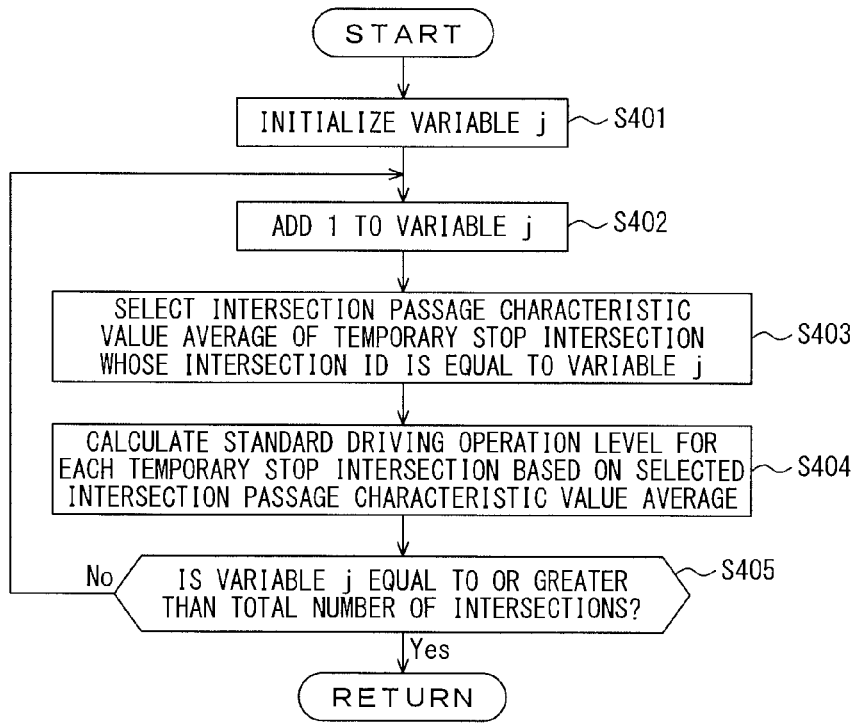

| INTERSECTION PASSAGE CHARACTERISTIC VALUE AVERAGE ($V_{minAve}$ (km/h)) | STANDARD DRIVING OPERATION LEVEL OF DRIVER WHEN ENTERING TEMPORARY STOP INTERSECTION |
|---|---|
| 0 ~ 5 | HIGH |
| 5 ~ 10 | INTERMEDIATE |
| 10 ~ | LOW |

FIG. 12A
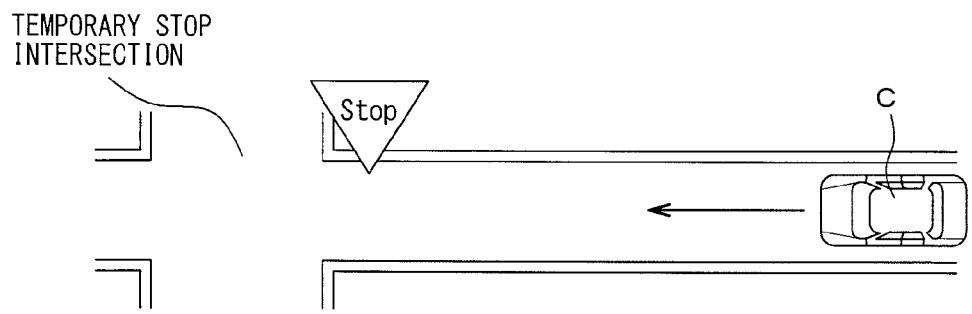
FIG. 12B
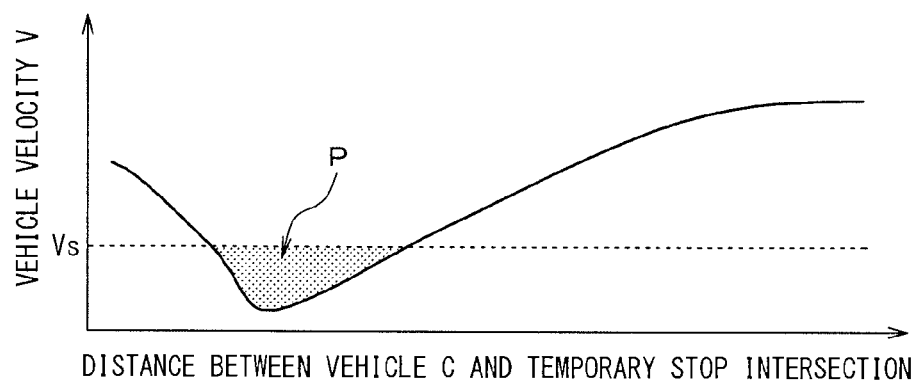
FIG. 13
| INTERSECTION PASSAGE CHARACTERISTIC VALUE AVERAGE ($P_{Ave}$ (km/h·m)) | STANDARD DRIVING OPERATION LEVEL OF DRIVER WHEN ENTERING TEMPORARY STOP INTERSECTION |
|---|---|
| ~ 0 | LOW |
| 0 ~ 5 | INTERMEDIATE |
| 5 ~ | HIGH |

| INTERSECTION PASSAGE CHARACTERISTIC VALUE STANDARD DEVIATION ($V_{min\sigma}$ (km/h)) | STANDARD DRIVING OPERATION LEVEL OF DRIVER WHEN ENTERING TEMPORARY STOP INTERSECTION |
|---|---|
| $0 \sim V_1$ | LOW |
| $V_1 \sim V_2$ | INTERMEDIATE |
| $V_2 \sim$ | HIGH |

FIG. 18
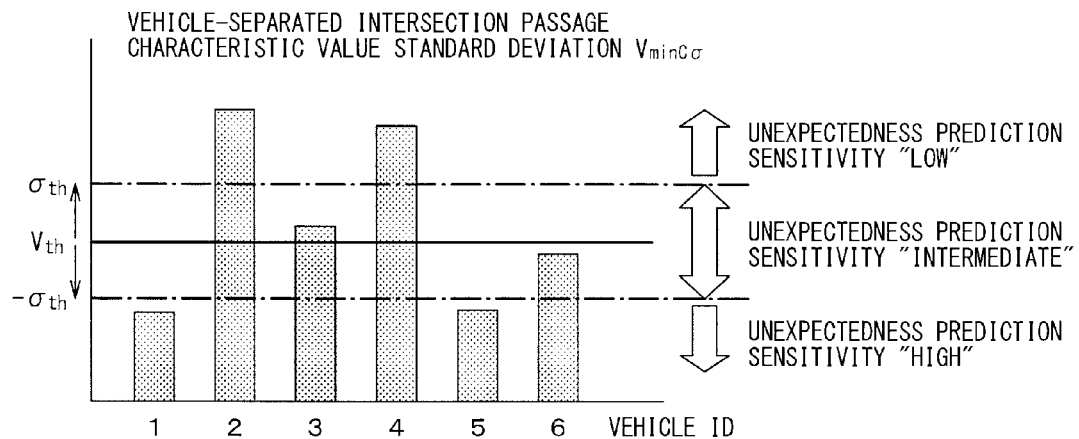
FIG. 19
| INTERSECTION PASSAGE CHARACTERISTIC VALUE STANDARD DEVIATION ($P_\sigma$ (km/h·m)) | STANDARD DRIVING OPERATION LEVEL OF DRIVER WHEN ENTERING TEMPORARY STOP INTERSECTION |
|---|---|
| $0 \sim P_1$ | HIGH |
| $P_1 \sim P_2$ | INTERMEDIATE |
| $P_2 \sim$ | LOW |
FIG. 20
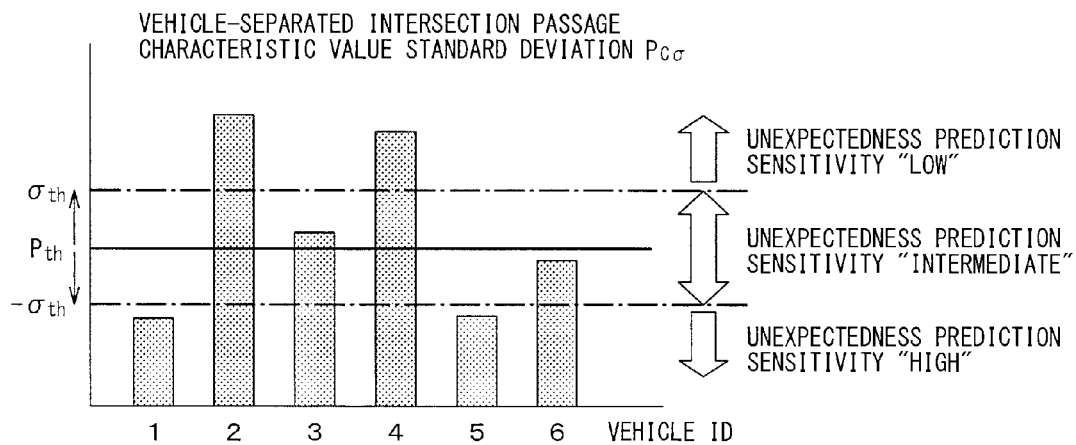

UNEXPECTEDNESS PREDICTION SENSITIVITY DETERMINATION APPARATUS

CROSS-REFERENCE TO RELATED APPLICATION

This application claims priority from Japanese Patent Application No. 2012-60435, filed Mar. 16, 2012, which is incorporated herein in its entirety by reference.

TECHNICAL FIELD

The present invention relates to an unexpectedness prediction sensitivity determination apparatus.

BACKGROUND

As an unexpectedness prediction sensitivity determination apparatus, for example, there is a related art technique disclosed in Japanese Patent No. 3882541.
In this related art technique, a vehicle collects vehicle velocity information. Subsequently, the vehicle transmits the collected vehicle velocity information to a base station. Subsequently, the base station records the received vehicle velocity information. Subsequently, the base station determines an unexpectedness prediction sensitivity of a driver based on the entire recorded vehicle velocity information. The unexpectedness prediction sensitivity refers to an index indicating a degree of capacity of predicting unexpected situations in which the vehicle approaches an obstacle such as another vehicle (caused since the vehicle approaches another vehicle that travels a lane intersecting with a traveling lane of the vehicle, or the like), for example.

BRIEF SUMMARY

However, in Japanese Patent No. 3882541, the unexpectedness prediction sensitivity of the driver is determined simply based on the entire recorded vehicle velocity information. Thus, for example, when a driving operation of the driver is changed for each temporary stop intersection according to an intersection state such as visibility or a traffic volume of a temporary stop intersection and thus the vehicle velocity when entering the temporary stop intersection varies, there is a possibility that determination accuracy of the unexpectedness prediction sensitivity of the driver when entering the temporary stop intersection deteriorates.
The invention is made in order to solve the above problem, and an object thereof is to improve determination accuracy of an unexpectedness prediction sensitivity of a driver when entering a temporary stop intersection.
According to an aspect of the invention, for example, a standard driving operation level of a driver when entering a temporary stop intersection is determined for each temporary stop intersection based on intersection travel information received from plural vehicles. Subsequently, in this aspect of the invention, the unexpectedness prediction sensitivity of the driver when entering the temporary stop intersection is determined based on the intersection travel information associated with the temporary stop intersections where determined standard driving operation levels of the drivers are identical to one another.

BRIEF DESCRIPTION OF DRAWINGS

FIG. 5 is a flowchart illustrating details of a process executed in step S204;
FIG. 6 is a flowchart illustrating details of a process executed in step S205;
FIGS. 12A and 12B are diagrams illustrating an intersection passage characteristic value;
FIG. 13 is a diagram illustrating the relationship between an intersection passage characteristic value average and a standard driving operation level of a driver;
FIG. 18 is a diagram illustrating the relationship between a vehicle-separated intersection passage characteristic value standard deviation and an unexpectedness prediction sensitivity;
FIG. 19 is a diagram illustrating the relationship between an intersection passage characteristic value standard deviation and a standard driving operation level of a driver;
and
FIG. 20 is a diagram illustrating the relationship between a vehicle-separated intersection passage characteristic value standard deviation and an unexpectedness prediction sensitivity.

DETAILED DESCRIPTION

Figure 1:
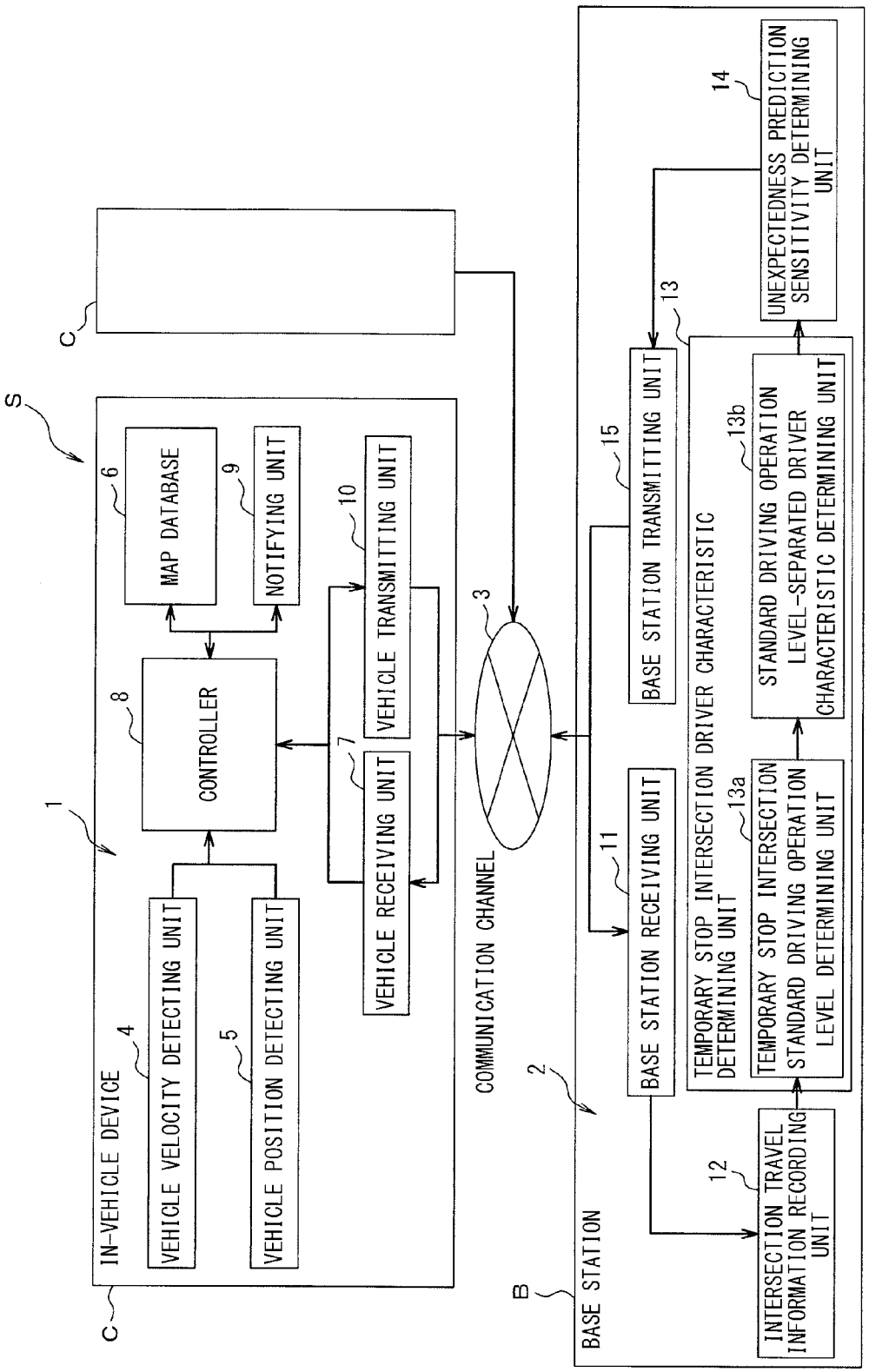
FIG. 1 is a diagram illustrating a schematic configuration of an unexpectedness prediction sensitivity determination system S.

Hereinafter, embodiments of the invention will now be described with reference to the drawings.
In the present embodiments, the invention is applied to an unexpectedness prediction sensitivity determination system S.
(Configuration)
FIG. 1 is a diagram schematically illustrating a configuration of an unexpectedness prediction sensitivity determination system S.
As shown in FIG. 1, the unexpectedness prediction sensitivity determination system S includes an in-vehicle device 1 that is mounted in each of plural vehicles C and an unexpectedness prediction sensitivity determination apparatus 2 provided in a base station B. The in-vehicle device 1 and the unexpectedness prediction sensitivity determination apparatus 2 transmit and receive information through a communication channel 3.

(Configuration of in-Vehicle Device 1)

The in-vehicle device 1 includes a vehicle velocity detecting unit 4, a vehicle position detecting unit 5, a map database 6, a vehicle receiving unit 7, a controller 8, a notifying unit 9 and a vehicle transmitting unit 10.

The vehicle velocity detecting unit 4 detects a current vehicle velocity V of the vehicle C. Further, the vehicle velocity detecting unit 4 outputs information indicating the detected current vehicle velocity V to the controller 8. As the vehicle velocity detecting unit 4, for example, a vehicle velocity sensor that detects a vehicle velocity based on a rotational speed of a wheel of the vehicle C is employed.

The vehicle position detecting unit 5 detects a current position of the vehicle C. Further, the vehicle position detecting unit 5 outputs information indicating the detected current position to the controller 8. As the vehicle position detecting unit 5, for example, a global positioning system (GPS) receiver is employed.

The map database 6 records therein map information about an area where the vehicle C is traveling. The map information includes information about the position, shape, type and the like of a road or a temporary stop intersection. The temporary stop intersection refers to an intersection where the vehicle C should temporarily stop when entering the intersection. The temporary stop intersection may include an intersection where the temporary stop is obligated by regulations, a predetermined intersection where the temporary stop is not obligated by regulations but is expected, or the like, for example. Further, the temporary stop intersection includes an intersection where a traffic signal is present and an intersection where the traffic signal is not present.

The vehicle receiving unit 7 receives information transmitted by the unexpectedness prediction sensitivity determination apparatus 2 through the communication channel 3. Further, the vehicle receiving unit 7 outputs the received information to the controller 8.

Figure 2A:
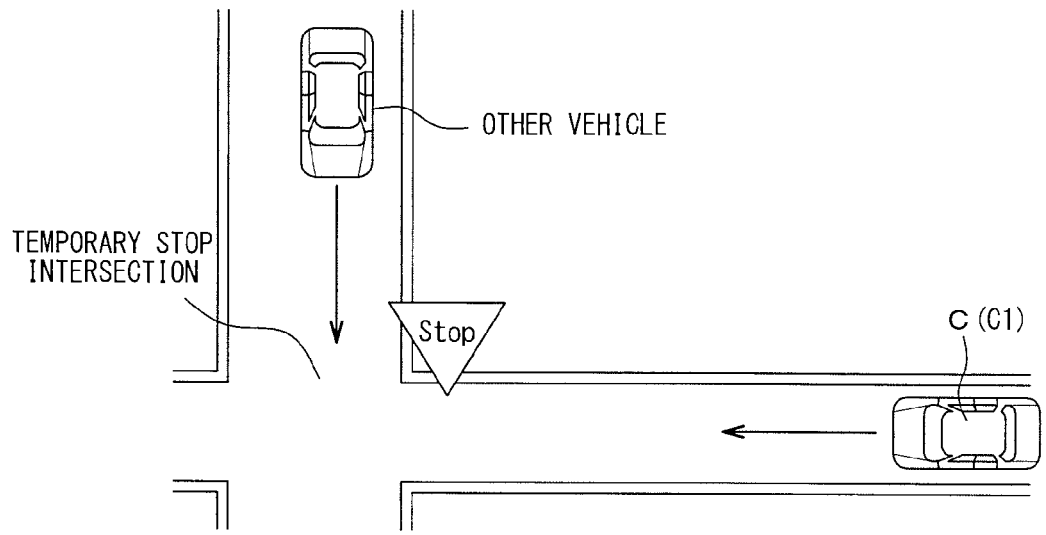
FIGS. 2A and 2B are diagrams illustrating an intersection passage characteristic value.
Figure 2B:
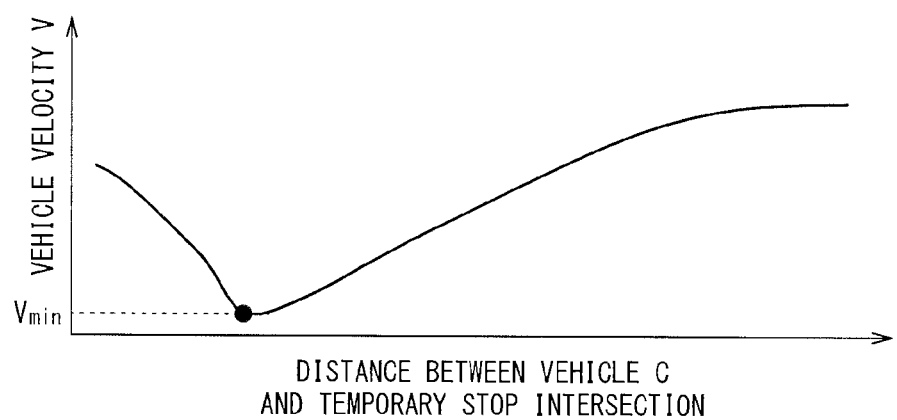

FIGS. 2A and 2B are diagrams illustrating an intersection passage characteristic value.

The controller 8 executes an intersection travel information transmission process based on the information output by the vehicle velocity detecting unit 4 and the vehicle position detecting unit 5 and the map information recorded in the map database 6. In the intersection travel information transmission process, the controller 8 generates intersection travel information every time the vehicle C travels through the temporary stop intersection. The intersection travel information refers to data that includes an intersection passage characteristic value when entering the temporary stop intersection, an intersection ID of the intersection where the corresponding intersection passage characteristic value is obtained and a vehicle ID of the vehicle C. The intersection ID refers to unique information set for each temporary stop intersection, which may uniquely specify the temporary stop intersection. For example, as the intersection ID, a numerical number of 1 to n (where n is the total number of temporary stop intersections registered in map data) may be employed. The vehicle ID refers to unique information set for each vehicle C mounted with the in-vehicle device 1, which may uniquely specify the vehicle C. As the vehicle ID, for example, a numerical number of 1 to m (where m is the total number of vehicles C mounted with the in-vehicle device 1) may be employed. Thus, the intersection and the vehicle C are associated with the intersection travel information. The intersection passage characteristic value refers to a travel state amount indicating a travel state of the vehicle C when entering the temporary stop intersection, which is an index value indicating a standard driving operation level of a driver when entering the temporary stop intersection (to be described later) and an unexpectedness prediction sensitivity of the driver. In the present embodiment, as shown in FIGS. 2A and 2B, the minimum value of a vehicle velocity V when entering the temporary stop intersection (hereinafter, also referred to as a minimum vehicle velocity Vmin) is employed as the intersection passage characteristic value. Then, the controller 8 transmits the generated intersection travel information to the unexpectedness prediction sensitivity determination apparatus 2 through the vehicle transmitting unit 10.

Further, the controller 8 outputs a notification command for notifying the determination result of the unexpectedness prediction sensitivity of the driver of the vehicle C based on the information output by the vehicle receiving unit 7, to the notifying unit 9.

The notifying unit 9 notifies the determination result of the unexpectedness prediction sensitivity of the driver of the vehicle C based on the notification command output by the controller 8. As the notifying unit 9, for example, a monitor or a speaker is employed.

The vehicle transmitting unit 10 transmits the intersection travel information generated by the controller 8 to the unexpectedness prediction sensitivity determination apparatus 2 through the communication channel 3.

(Configuration of Unexpectedness Prediction Sensitivity Determination Apparatus 2)

The unexpectedness prediction sensitivity determination apparatus 2 includes a base station receiving unit 11, an intersection travel information recording unit 12, a temporary stop intersection driver characteristic determining unit 13, an unexpectedness prediction sensitivity determining unit 14, and a base station transmitting unit 16.

The base station receiving unit 11 receives the intersection travel information transmitted by the vehicle transmitting unit 10 through the communication channel 3. Further, the base station receiving unit 11 outputs the received intersection travel information to the intersection travel information recording unit 12.

The intersection travel information recording unit 12 records therein the intersection travel information about the plural vehicles C based on the intersection travel information received by the base station receiving unit 11. As the intersection travel information recording unit 12, for example, a hard disk drive (HDD) or a random access memory (RAM) is employed.

The temporary stop intersection driver characteristic determining unit 13 includes a temporary stop intersection standard driving operation level determining unit 13a and a standard driving operation level-separated driver characteristic determining unit 13b.

The temporary stop intersection standard driving operation level determining unit 13a calculates an average value VminAve (hereinafter, also referred to as an intersection passage characteristic value average) of the intersection passage characteristic value Vmin for each temporary stop intersection, based on the intersection travel information received from the plural vehicles C among the intersection travel information recorded in the intersection travel information recording unit 12. As the intersection travel information received from the plural vehicles C, for example, the intersection travel information received from all the vehicles C that enter the target temporary stop intersection is employed. Subsequently, the temporary stop intersection standard driving operation level determining unit 13a determines the standard driving operation level of the driver when entering the temporary stop intersection for each temporary stop intersection based on the calculated intersection passage characteristic value average VminAve. As the standard driving operation level of the driver when entering the temporary stop intersection, for example, an index of the level of a driving operation of a standard driver when entering the temporary stop intersection is used. In the present embodiment, it is determined which one of predetermined plural stages the standard driving operation level of the driver is at. As the predetermined plural stages, for example, three stages of "high", "intermediate" and "low" are employed.

The standard driving operation level-separated driver characteristic determining unit 13b selects the intersection travel information associated with the temporary stop intersections where standard driving operation levels of the drivers determined by the temporary stop intersection standard driving operation level determining unit 13a are identical to one another, among the intersection travel information recorded in the intersection travel information recording unit 12. In the present embodiment, among the temporary stop intersections where standard driving operation levels of the drivers are identical to one another, the intersection travel information associated with the temporary stop intersections where the standard driving operation level of the driver is at the highest stage "high" is employed. Subsequently, the standard driving operation level-separated driver characteristic determining unit 13b calculates an average value (hereinafter, also referred to as a vehicle-separated intersection passage characteristic value average) VminCAve of the intersection passage characteristic value Vmin for each vehicle C based on the selected intersection travel information. In the present embodiment, an example in which the temporary stop intersection standard driving operation level determining unit 13a employs the intersection travel information associated with the intersections where the standard driving operation level of the driver is at the highest stage "high" is shown, but a different configuration may be employed. For example, the intersection travel information associated with the intersections where the standard driving operation level of the driver is at the stage of "intermediate" or "low" may be employed.

The unexpectedness prediction sensitivity determining unit 14 determines the unexpectedness prediction sensitivity of the driver when entering the temporary stop intersection for each vehicle C based on the vehicle-separated intersection passage characteristic value average VminCAve calculated in the standard driving operation level-separated driver characteristic determining unit 13b. The unexpectedness prediction sensitivity of the driver refers to an index value indicating a possibility that the vehicle C is approaching another vehicle or a pedestrian when entering the temporary stop intersection. In the present embodiment, it is determined which one of the predetermined plural stages the unexpectedness prediction sensitivity is at. As the predetermined plural stages, for example, three stages of "high", "intermediate" and "low" are employed.

The base station transmitting unit 15 transmits the unexpectedness prediction sensitivity of the driver determined by the unexpectedness prediction sensitivity determining unit 14 to the vehicle receiving unit 7 provided in each of the plural vehicles C through the communication channel 3.

(Computing process)

Next, an intersection travel information transmission process executed by the controller 8 will be described.

Figure 3:
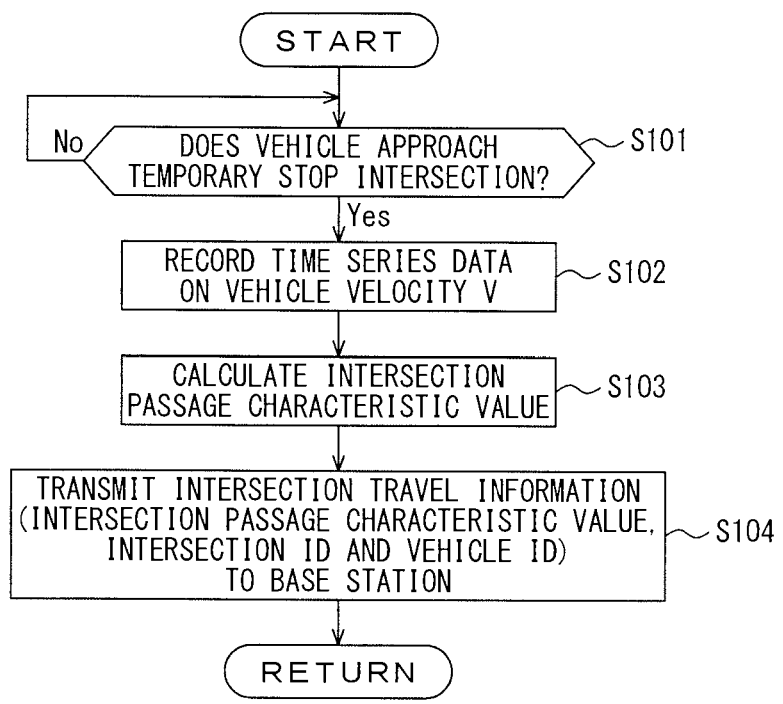
FIG. 3 is a flowchart illustrating an intersection travel information transmission process.

FIG. 3 is a flowchart illustrating the intersection travel information transmission process.

As shown in FIG. 3, in step S101, the controller 8 determines whether or not the vehicle C approaches the temporary stop intersection based on the current position of the vehicle C detected by the vehicle position detecting unit 5 and the map data recorded in the map database 6. Specifically, the controller 8 determines whether or not the vehicle C is within a predetermined set range of the temporary stop intersection (for example, within a range of a radius of 30 m from the center of the temporary stop intersection). Then, if it is determined that the vehicle C is within the set range of the temporary stop intersection (Yes), the controller 8 determines that the vehicle C approaches the temporary stop intersection, and the procedure proceeds to step S102. On the other hand, if it is determined that the vehicle C is out of the set range of the temporary stop intersection (No), the controller 8 determines that the vehicle C does not approach the temporary stop intersection, and the determination at step S101 is executed again.

In step S102, the controller 8 records time series data on the vehicle velocity V when traveling through the temporary stop intersection (hereinafter, also referred to as a target intersection) that is determined as being approached by the vehicle C in step S101. Specifically, first, the controller 8 starts the recording of the time series data on the vehicle velocity V. A sampling time of the time series data is set to 10 ms, for example. Subsequently, the controller 8 determines whether or not the vehicle C finishes passage through the target intersection. If it is determined that the vehicle C finishes the passage through the target intersection, the controller 8 ends the recording of the time series data on the vehicle velocity V. On the other hand, if it is determined that the vehicle C does not finish the passage through the target intersection, the controller 8 executes the determination again.

Subsequently, the procedure proceeds to step S103, and then, the controller 8 calculates the intersection passage characteristic value (minimum vehicle velocity) Vmin based on the time series data on the vehicle velocity V recorded in step S102.

Subsequently, the controller 8 generates intersection travel information including the calculated intersection passage characteristic value Vmin, an intersection ID of the target intersection and a vehicle ID of the vehicle C.

Subsequently, the procedure proceeds to step S104, and then, the controller 8 transmits the intersection travel information generated in step S103 to the base station B through the vehicle transmitting unit 10.

Next, an unexpectedness prediction sensitivity determination process executed by the unexpectedness prediction sensitivity determination apparatus 2 (the base receiving unit 11, the intersection travel information recording unit 12, the temporary stop intersection driver characteristic determining unit 13, the unexpectedness prediction sensitivity determining unit 14 and the base station transmitting unit 15) will be described.

Figure 4:
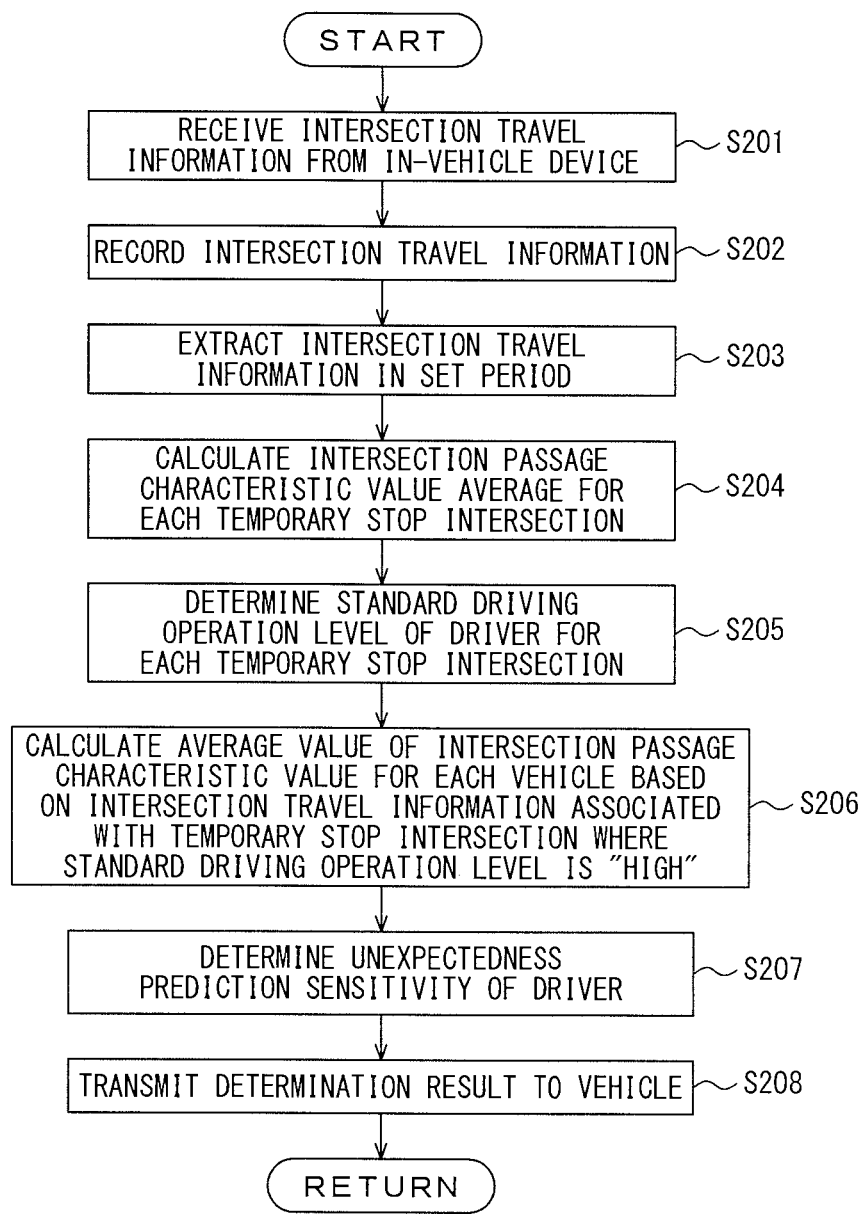
FIG. 4 is a flowchart illustrating an unexpectedness prediction sensitivity determination process.

FIG. 4 is a flowchart illustrating the unexpectedness prediction sensitivity determination process.

As shown in FIG. 4, in step S201, the base station receiving unit 11 receives the intersection travel information (the data including the intersection passage characteristic value, the intersection ID of the target temporary stop intersection and the vehicle ID of the vehicle C) transmitted by the in-vehicle device 1.

Subsequently, the procedure proceeds to step S202, and then, the intersection travel information recording unit 12 records the intersection travel information received in step S201. Thus, the intersection travel information recording unit 12 records the intersection travel information of plural vehicles at plural temporary stop intersections.

Subsequently, the procedure proceeds to step S203, and then, the temporary stop intersection standard driving operation level determining unit 13a extracts the intersection travel information recorded in a predetermined set period (for example, a period of 30 days prior to the current date) from among the intersection travel information recorded in the intersection travel information recording unit 12.

FIG. 5 is a flowchart illustrating details of the process executed in step S204.

Subsequently, the procedure proceeds to step S204, and then, the temporary stop intersection standard driving operation level determining unit 13a calculates the average value (intersection passage characteristic value average) VminAve of the intersection passage characteristic value Vmin for each temporary stop intersection based on the intersection travel information received from the plural vehicles C (that is, all the vehicles) among the intersection travel information extracted in step S203. Specifically, as shown in FIG. 5, first, the temporary stop intersection standard driving operation level determining unit 13a initializes a variable i to 0 (step S301). Subsequently, the temporary stop intersection standard driving operation level determining unit 13a adds 1 to the variable i (step S302). Subsequently, the temporary stop intersection standard driving operation level determining unit 13a selects the intersection travel information including the intersection ID having a numerical value equal to the variable i from among the extracted intersection travel information (step S303). Subsequently, the temporary stop intersection standard driving operation level determining unit 13a sets the average value (the intersection passage characteristic value average) VminAve of the intersection passage characteristic value Vmin included in the selected intersection travel information as an average value of the intersection passage characteristic value of the temporary stop intersection whose intersection ID is equal to the variable i (step S304). Further, the temporary stop intersection standard driving operation level determining unit 13a repeats the flow (steps S302 to S304) until the variable i becomes equal to or greater than the total number of the intersections (step S305). Thus, the temporary stop intersection standard driving operation level determining unit 13a calculates the intersection passage characteristic value average VminAve with respect to all the temporary stop intersections.

Figures 7, 8:
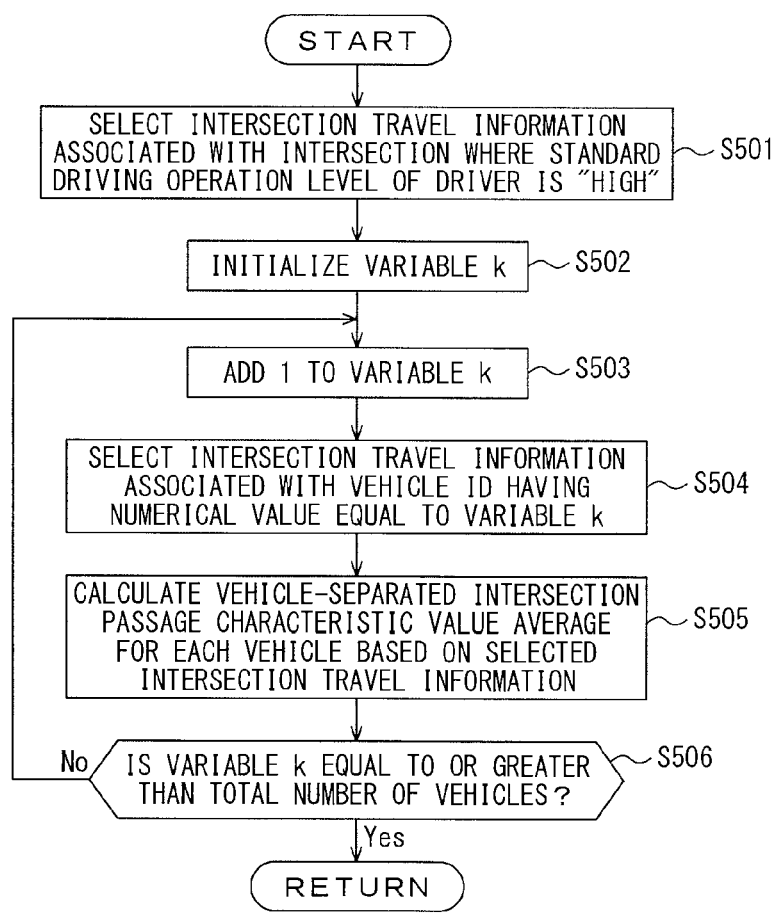
FIG. 7 is a diagram illustrating the relationship between an intersection passage characteristic value average and a standard driving operation level of a driver.
FIG. 8 is a flowchart illustrating details of a process executed in step S206.

FIG. 6 is a flowchart illustrating details of the process executed in step S205. FIG. 7 is a diagram illustrating the relationship between the intersection passage characteristic value average and the standard driving operation level of the driver.

Subsequently, the procedure proceeds to step S205, and then, the temporary stop intersection standard driving operation level determining unit 13a determines the standard driving operation level of the driver when entering the temporary stop intersection for each temporary stop intersection based on the intersection passage characteristic value average VminAve calculated in step S204. Specifically, the temporary stop intersection standard driving operation level determining unit 13a initializes a variable j to 0, as shown in FIG. 6 (step S401). Subsequently, the temporary stop intersection standard driving operation level determining unit 13a adds 1 to the variable j (step S402). Subsequently, the temporary stop intersection standard driving operation level determining unit 13a selects, from among the calculated intersection passage characteristic value average VminAve, the intersection passage characteristic value average VminAve corresponding to the temporary stop intersection whose intersection ID is equal to the variable j (step S403). Subsequently, the temporary stop intersection standard driving operation level determining unit 13a determines the standard driving operation level of the driver when entering the temporary stop intersection whose intersection ID is equal to the variable j, based on the selected intersection passage characteristic value average VminAve.

Specifically, as shown in FIG. 7, if the selected intersection passage characteristic value average VminAve is equal to or greater than 0 km/h and less than 5 km/h, the temporary stop intersection standard driving operation level determining unit 13a determines that the standard driving operation level of the driver when entering the temporary stop intersection whose intersection ID is equal to the variable j is "high". On the other hand, if the selected intersection passage characteristic value average VminAve is equal to or greater than 5 km/h and less than 10 km/h, the temporary stop intersection standard driving operation level determining unit 13a determines that the standard driving operation level of the driver when entering the temporary stop intersection whose intersection ID is equal to the variable j is "intermediate". Further, if the selected intersection passage characteristic value average VminAve is equal to or greater than 10 km/h, the temporary stop intersection standard driving operation level determining unit 13a determines that the standard driving operation level of the driver when entering the temporary stop intersection whose intersection ID is equal to the variable j is "low" (step S404). Thus, the temporary stop intersection standard driving operation level determining unit 13a determines that as the intersection passage characteristic value average VminAve is smaller, the standard driving operation level of the driver when entering the temporary stop intersection is higher. That is, at the temporary stop intersection where the visibility is poor, the vehicle velocity V when entering the intersection becomes a relatively small value. Accordingly, if the intersection passage characteristic value average VminAve is a small value, it is determined that the standard driving operation level of the driver when entering the temporary stop intersection is "high". On the other hand, at the temporary stop intersection where the visibility is good, the vehicle velocity V when entering the intersection becomes a relatively large value. Accordingly, if the intersection passage characteristic value average VminAve is a small value, it is determined that the standard driving operation level of the driver when entering the temporary stop intersection is "low". Further, until the variable j becomes equal to or greater than the total number of the intersections, the temporary stop intersection standard driving operation level determining unit 13a repeats the flow (step S402 to S404) (step S405). Thus, the temporary stop intersection standard driving operation level determining unit 13a determines the standard driving operation level of the driver when entering the temporary stop intersection with respect to all the temporary stop intersections.

FIG. 8 is a flowchart illustrating details of the process executed in step S206.

Subsequently, the procedure proceeds to step S206, and then, as shown in FIG. 8, the standard driving operation level-separated driver characteristic determining unit 13b selects the intersection travel information associated with the temporary stop intersection where the standard driving operation level of the driver determined in step S205 is "high", from among the intersection travel information extracted in step S203 (step S501). Subsequently, the standard driving operation level-separated driver characteristic determining unit 13b calculates the average value (vehicle-separated intersection passage characteristic value average) VminCAve of the intersection passage characteristic value Vmin for each vehicle C based on the selected intersection travel information. Specifically, the standard driving operation level-separated driver characteristic determining unit 13b initializes a variable k to 0 (step S502). Subsequently, the standard driving operation level-separated driver characteristic determining unit 13b adds 1 to the variable k (step S503). Subsequently, the standard driving operation level-separated driver characteristic determining unit 13b selects the intersection travel information associated with the vehicle ID having a numerical value equal to the variable k from among the intersection travel information selected in step S501 (step S504). Subsequently, the standard driving operation level-separated driver characteristic determining unit 13b sets the average value of the intersection passage characteristic value Vmin included in the selected intersection travel information as the average value (vehicle-separated intersection passage characteristic value average) VminCAve of the intersection passage characteristic value of the vehicle whose vehicle ID is equal to the variable k (step S505). Further, the standard driving operation level-separated driver characteristic determining unit 13b repeats the flow (step S503 to S505) until the variable k becomes equal to or greater than the total number of the vehicles (step S506). Thus, the standard driving operation level-separated driver characteristic determining unit 13b calculates the vehicle-separated intersection passage characteristic value average VminCAve with respect to all the vehicles C.

Figure 9:
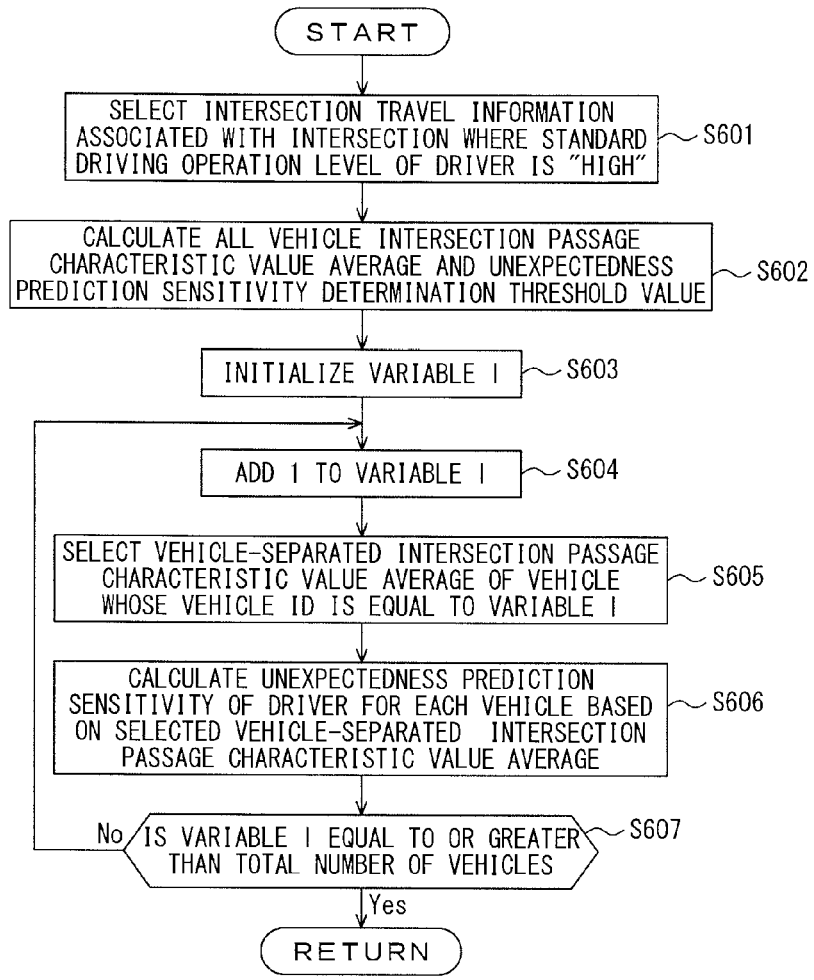
FIG. 9 is a flowchart illustrating details of a process executed in step S207.

FIG. 9 is a flowchart illustrating details of the process executed in step S207.

Subsequently, the procedure proceeds to step S207, and then, the unexpectedness prediction sensitivity determining unit 14 determines the unexpectedness prediction sensitivity of the driver when entering the temporary stop intersection for each vehicle C based on the intersection travel information extracted in step S203 and the standard driving operation level of the driver determined in step S205. Specifically, as shown in FIG. 9, the unexpectedness prediction sensitivity determining unit 14 selects the intersection travel information associated with the temporary stop intersection where the standard driving operation level of the driver determined in step S205 is "high" from among the intersection travel information extracted in step S203 (step S601). Subsequently, the unexpectedness prediction sensitivity determining unit 14 calculates an average value (hereinafter, also referred to as an all vehicle intersection passage characteristic value average) Vth of the intersection passage characteristic value Vmin included in the selected intersection travel information and a standard deviation (hereinafter, referred to as an unexpectedness prediction sensitivity determination threshold value) σth of the intersection passage characteristic value Vmin (step 602). As a method of calculating the standard deviation of the intersection passage characteristic value Vmin, for example, a method of setting a frequency distribution of the intersection passage characteristic value Vmin included in the selected intersection travel information, fitting the set frequency distribution to a normal distribution and calculating a standard deviation of the fitted normal distribution is used.

Subsequently, the unexpectedness prediction sensitivity determining unit 14 determines the unexpectedness prediction sensitivity of the driver when entering the temporary stop intersection for each vehicle C based on the difference between the calculated all vehicle intersection passage characteristic value average Vth and the vehicle-separated intersection passage characteristic value average VminCAve calculated in step S206. Specifically, the unexpectedness prediction sensitivity determining unit 14 initializes a variable l to 0 (step S603). Subsequently, the unexpectedness prediction sensitivity determining unit 14 adds 1 to the variable l (step S604). Subsequently, the unexpectedness prediction sensitivity determining unit 14 selects the vehicle-separated intersection passage characteristic value average VminCAve of the vehicle whose vehicle ID is equal to the variable l from among the calculated vehicle-separated intersection passage characteristic value average VminCAve (step S605).

Figure 10:
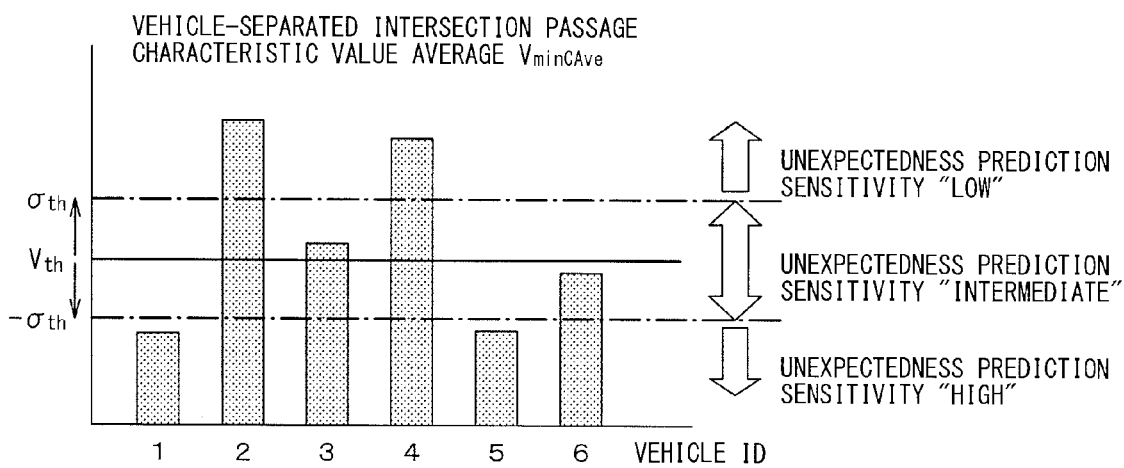
FIG. 10 is a diagram illustrating the relationship between a vehicle-separated intersection passage characteristic value average and an unexpectedness prediction sensitivity.

FIG. 10 is a diagram illustrating the relationship between the vehicle-separated intersection passage characteristic value average and the unexpectedness prediction sensitivity.

Subsequently, the unexpectedness prediction sensitivity determining unit 14 determines the unexpectedness prediction sensitivity of the driver of the vehicle C whose vehicle ID is equal to the variable l when entering the temporary stop intersection based on a subtraction result obtained by subtracting the all vehicle intersection passage characteristic value average Vth from the selected vehicle-separated intersection passage characteristic value average VminCAve (step S606). Specifically, as shown in FIG. 10, if the subtraction result is equal to or greater than the unexpectedness prediction sensitivity determination threshold value σth, the unexpectedness prediction sensitivity determining unit 14 determines that the unexpectedness prediction sensitivity of the driver of the vehicle C whose vehicle ID is equal to the variable l when entering the temporary stop intersection is "low".

On the other hand, if the subtraction result is less than the unexpectedness prediction sensitivity determination threshold value σth and is equal to or greater than a sign-inverted threshold value (−σth), the unexpectedness prediction sensitivity determining unit 14 determines that the unexpectedness prediction sensitivity of the driver of the vehicle C whose vehicle ID is equal to the variable l when entering the temporary stop intersection is "intermediate". Here, the sign-inverted threshold value (−σth) represents a numerical value obtained by multiplying the unexpectedness prediction sensitivity determination threshold value σth by "−1". Further, if the subtraction result is equal to or less than the sign-inverted threshold value (−σth), the unexpectedness prediction sensitivity determining unit 14 determines that the unexpectedness prediction sensitivity of the driver of the vehicle C whose vehicle ID is equal to the variable l when entering the temporary stop intersection is "high" (step S606).

Thus, the unexpectedness prediction sensitivity determining unit 14 determines that as the subtraction result (VminCAve−Vth) is smaller, the unexpectedness prediction sensitivity of the driver of the vehicle C when entering the temporary stop intersection is higher. That is, a vehicle having a large average value of the minimum vehicle velocity Vmin when entering the temporary stop intersection has a high possibility of approaching another vehicle or a pedestrian when entering the temporary stop intersection. Accordingly, if the subtraction result (VminCAve−Vth) is a large value, it is determined that the unexpectedness prediction sensitivity of the driver when entering the temporary stop intersection is "low". On the other hand, a vehicle having a small average value of the minimum vehicle velocity Vmin when entering the temporary stop intersection has a low possibility of approaching another vehicle or a pedestrian when entering the temporary stop intersection. Accordingly, if the subtraction result (VminCAve−Vth) is a small value, it is determined that the unexpectedness prediction sensitivity of the driver when entering the temporary stop intersection is "high". Further, the unexpectedness prediction sensitivity determining unit 14 repeats the flow (step S604 to S606) until the variable l becomes equal to or greater than the total number of the vehicles (step S607). Thus, the unexpectedness prediction sensitivity determining unit 14 determines the unexpectedness prediction sensitivity of the driver when entering the temporary stop intersection with respect to all the vehicles C.

Subsequently, the procedure proceeds to step S208, and then, the unexpectedness prediction sensitivity determining unit 14 transmits the determination result of the unexpectedness prediction sensitivity performed in step S207 to the vehicle C specified by the vehicle ID of the intersection travel information received in step S201 through the base station transmitting unit 15.

In the present embodiment, an example in which the determination result of the unexpectedness prediction sensitivity of the driver when entering the temporary stop intersection is transmitted to the vehicle C is shown, but a different configuration may be employed. For example, a configuration in which the determination result of the unexpectedness prediction sensitivity of the driver when entering the temporary stop intersection is used for setting of automobile insurance (for example, setting of grades) may be used. In this case, the determination result of the unexpectedness prediction sensitivity of the driver when entering the temporary stop intersection may be transmitted to an insurance company or the like that handles automobile insurance through the communication channel 3.

(Operation and Others)

Next, an operation of the unexpectedness prediction sensitivity determination system S will be described.

As shown in FIG. 2A, it is assumed that, during traveling on a road, a temporary stop intersection appears in front of the vehicle C (hereinafter, also referred to as a vehicle C1) and the vehicle C1 enters the temporary stop intersection and passes through the temporary stop intersection. Then, the controller 8 of the vehicle C1 records time series data on the vehicle velocity V when entering the temporary stop intersection (steps S101 and S102 in FIG. 3). Subsequently, the controller 8 of the vehicle C1 calculates the intersection passage characteristic value (minimum vehicle velocity) Vmin based on the recorded time series data on the vehicle velocity V, and generates intersection travel information based on the calculated intersection passage characteristic value Vmin (step S103 in FIG. 3). Further, the controller 8 of the vehicle C1 transmits the generated intersection travel information to the base station B through the vehicle transmitting unit 10 (step S104 in FIG. 3).

Further, the unexpectedness prediction sensitivity determination apparatus 2 of the base station B receives the intersection travel information output by the controller 8 and records the received intersection travel information (by the base station receiving unit 11 and the intersection travel information recording unit 12 in FIG. 1) (steps S201 and S202 in FIG. 4). Subsequently, the unexpectedness prediction sensitivity determination apparatus 2 calculates the average value (intersection passage characteristic value average) VminAve of the intersection passage characteristic value for each temporary stop intersection based on the intersection travel information received from the plural vehicles C among the intersection travel information recorded in the intersection travel information recording unit 12 (by the temporary stop intersection standard driving operation level determining unit 13a in FIG. 1) (steps S203 and S204 in FIG. 4).

Here, at the temporary stop intersection where the visibility is poor, generally, there is a tendency that the vehicle velocity V when entering the temporary stop intersection becomes a relatively small value. Accordingly, the minimum vehicle velocity Vmin, that is, the intersection passage characteristic value Vmin becomes a relatively small value, and thus, the intersection passage characteristic value average VminAve becomes a relatively small value. On the other hand, at the temporary stop intersection where the visibility is good, generally there is a tendency that the vehicle velocity V, when entering the temporary stop intersection, becomes a relatively large value. Accordingly, the minimum vehicle velocity Vmin, that is, the intersection passage characteristic value Vmin becomes a relatively large value, and thus, the intersection passage characteristic value average VminAve becomes a relatively large value. Thus, the intersection passage characteristic value average VminAve, when entering the temporary stop intersection, varies for each temporary stop intersection Subsequently, the unexpectedness prediction sensitivity determination apparatus 2 determines the standard driving operation level of the driver when entering the temporary stop intersection for each temporary stop intersection based on the calculated intersection passage characteristic value average VminAve (by the temporary stop intersection standard driving operation level determining unit 13a in FIG. 1) (step S205 in FIG. 4). Here, as shown in FIG. 7, the unexpectedness prediction sensitivity determination apparatus 2 determines that the standard driving operation level of the driver when entering the temporary stop intersection is "high" at a temporary stop intersection where intersection passage characteristic value average VminAve satisfies $0 \leq \text{VminAve} < 5$. Further, the unexpectedness prediction sensitivity determination apparatus 2 determines that the standard driving operation level of the driver when entering the temporary stop intersection is "intermediate" at a temporary stop intersection where intersection passage characteristic value average VminAve satisfies $5 \leq \text{VminAve} < 10$. Further, the unexpectedness prediction sensitivity determination apparatus 2 determines that the standard driving operation level of the driver when entering the temporary stop intersection is "low" at a temporary stop intersection where intersection passage characteristic value average VminAve satisfies $10 \leq \text{VminAve}$.

Subsequently, the unexpectedness prediction sensitivity determination apparatus 2 selects the intersection travel information associated with the temporary stop intersection where the standard driving operation level of the driver is "high". Subsequently, the unexpectedness prediction sensitivity determination apparatus 2 calculates the average value (vehicle-separated intersection passage characteristic value average) VminCAve of the intersection passage characteristic value Vmin for each vehicle C based on the selected intersection travel information (by the standard driving operation level-separated driver characteristic determining unit 13b in FIG. 1) (step S206 in FIG. 4). Accordingly, the unexpectedness prediction sensitivity determination apparatus 2 calculates the vehicle-separated intersection passage characteristic value average VminCAve using only the intersection travel information associated with the temporary stop intersection where intersection passage characteristic value average VminAve is equal to or less than 5 km/h. Thus, since the standard driving operation level of the driver when entering the temporary stop intersection is changed according to an intersection characteristic such as the visibility or a traffic volume of the temporary stop intersection, even though the driving operation of the driver when entering the temporary stop intersection is changed and the intersection passage characteristic value average VminAve when entering the temporary stop intersection varies for each intersection, it is possible to reduce the variation of the intersection passage characteristic value average VminAve used for determination of the unexpectedness prediction sensitivity of the driver.

Subsequently, the unexpectedness prediction sensitivity determination apparatus 2 determines the unexpectedness prediction sensitivity of the driver when entering the temporary stop intersection for each vehicle C based on the calculated vehicle-separated intersection passage characteristic value average VminCAve (by the unexpectedness prediction sensitivity determining unit 14 in FIG. 1) (step S207 in FIG. 4). Here, as shown in FIG. 10, with respect to the vehicle C in which the subtraction result (VminCAve−Vth) obtained by subtracting the all vehicle intersection passage characteristic value average Vth from the vehicle-separated intersection passage characteristic value average VminCAve satisfies σth≤VminCAve−Vth, the unexpectedness prediction sensitivity determination apparatus 2 determines that the unexpectedness prediction sensitivity of the driver when entering the temporary stop intersection is "low". Further, with respect to the vehicle C in which the subtraction result (VminCAve−Vth) satisfies −σth≤VminCAve−Vth<σth, the unexpectedness prediction sensitivity determination apparatus 2 determines that the unexpectedness prediction sensitivity of the driver when entering the temporary stop intersection is "intermediate". Further, with respect to the vehicle C in which the subtraction result (VminCAve−Vth) satisfies VminCAve−Vth<−σth, the unexpectedness prediction sensitivity determination apparatus 2 determines that the unexpectedness prediction sensitivity of the driver when entering the temporary stop intersection is "high".

Subsequently, the unexpectedness prediction sensitivity determination apparatus 2 transmits the determination result of the unexpectedness prediction sensitivity to the vehicle C1 through the base station transmitting unit 15 (by the unexpectedness prediction sensitivity determining unit 14 in FIG. 1) (step S208 in FIG. 4). Further, the controller 8 of the vehicle C1 receives the determination result output by the unexpectedness prediction sensitivity determination apparatus 2 through the vehicle receiving unit 7, and outputs a notification command to the notifying unit 9. Further, the notifying unit 9 notifies the determination result of the unexpectedness prediction sensitivity of the driver when entering the temporary stop intersection according to the notification command.

As described above, the unexpectedness prediction sensitivity determination apparatus 2 of the present embodiment determines the unexpectedness prediction sensitivity of the driver when entering the temporary stop intersection based on the intersection travel information associated with the intersection where the standard driving operation level of the driver when entering the temporary stop intersection is "high", that is, the intersection where the visibility is poor. Accordingly, it is possible to delete the intersection travel information associated with the intersection where the visibility is good from the intersection travel information used for determination of the unexpectedness prediction sensitivity of the driver. Thus, in the unexpectedness prediction sensitivity determination apparatus 2 of the present embodiment, it is possible to suppress the unexpectedness prediction sensitivity of the driver when entering the temporary stop intersection from being mistakenly determined as "low" even though the frequency of passing the intersection where the visibility is good is high.

It is noted that, in the method of calculating the unexpectedness prediction sensitivity of the driver based on the intersection travel information associated with all the intersections regardless of the standard driving operation level of the driver, if the frequency of passing the intersection where the visibility is good is high, the vehicle-separated intersection passage characteristic value average VminCAve increases. Accordingly, there is a possibility that the unexpectedness prediction sensitivity of the driver when entering the temporary stop intersection is mistakenly determined as "low".

Figure 11A:
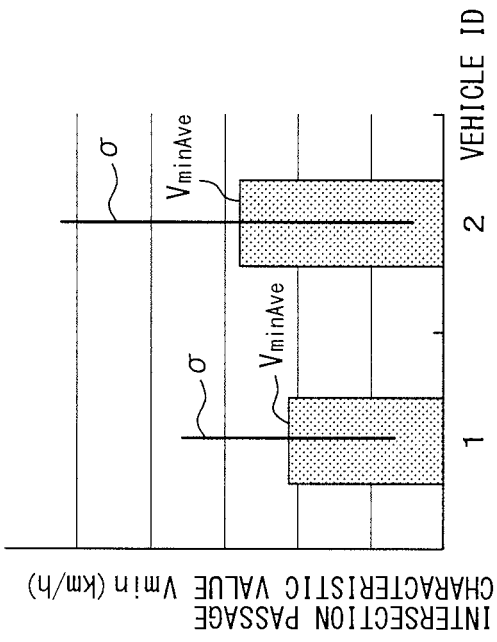
FIGS. 11A and 11B are diagrams illustrating a result of a test of a reduction effect of variation of an intersection passage characteristic value average.
Figure 11B:
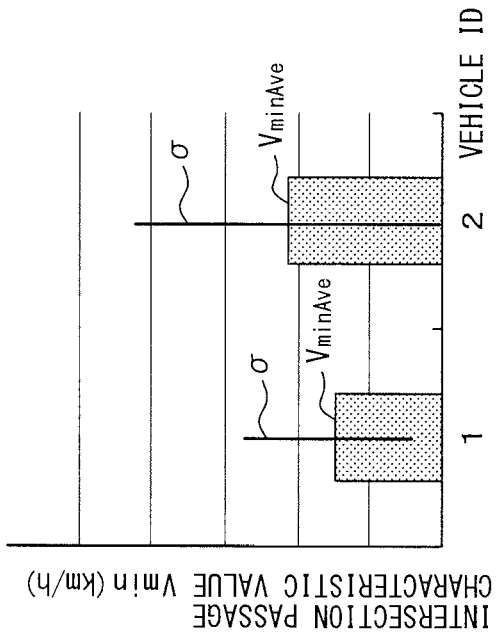

Here, a test of the reduction effect of the variation of the intersection passage characteristic value average VminAve was performed by the unexpectedness prediction sensitivity determination apparatus 2 of the present embodiment. In this test, as the method of the present embodiment, the unexpectedness prediction sensitivity determination threshold value σth of the intersection passage characteristic value Vmin was calculated for each vehicle C, using only the intersection travel information associated with the temporary stop intersection where standard driving operation level of the driver is "high" among the intersection travel information recorded in the intersection travel information recording unit 12. Further, as a comparative example, the unexpectedness prediction sensitivity determination threshold value σth of the intersection passage characteristic value Vmin was calculated for each vehicle C, using all the intersection travel information recorded in the intersection travel information recording unit 12, regardless of the standard driving operation levels of "high", "intermediate" and "low" of the driver. As a result of the experiment, as shown in FIGS. 11A and 11B, according to the method of the present embodiment, it can be confirmed that the variation of the intersection passage characteristic value Vmin is reduced compared with the method of the comparative example.

In the present embodiment, the intersection passage characteristic value Vmin forms a travel state amount. Similarly, the base station receiving unit 11 in FIG. 1 and step S201 in FIG. 4 form a receiving unit. Further, the intersection travel information recording unit 12 in FIG. 1 and step S202 in FIG. 4 form an intersection travel information recording unit. Further, the temporary stop intersection standard driving operation level determining unit 13a in FIG. 1 and steps S204 and S205 in FIG. 4 form a standard driving operation level determining unit. Further, the standard driving operation level-separated driver characteristic determining unit 13b in FIG. 1, the unexpectedness prediction sensitivity determining unit 14 and steps S206 and S207 in FIG. 4 form an unexpectedness prediction sensitivity determining unit. Further, the vehicle-separated intersection passage characteristic value average VminCAve forms a vehicle-separated travel state average value. Further, the temporary stop intersection standard driving operation level determining unit 13a in FIG. 1 and step S204 in FIG. 4 form an average value calculating unit. Further, the temporary stop intersection standard driving operation level determining unit 13a in FIG. 1 and step S205 in FIG. 4 form a standard driving operation level determination executing unit. Further, the standard driving operation level-separated driver characteristic determining unit 13b in FIG. 1 and step S206 in FIG. 4 form a vehicle-separated travel state average value calculating unit. Further, the all vehicle intersection passage characteristic value average Vth forms a plural-vehicle travel state average value. Further, the unexpectedness prediction sensitivity determining unit 14 in FIG. 1 and step S207 in FIG. 4 form a plural-vehicle travel state average value calculating unit and an unexpectedness prediction sensitivity determination executing unit.

Effects of the Present Embodiment

The present embodiment shows the following effects.

(1) The unexpectedness prediction sensitivity determination apparatus 2 determines the standard driving operation level of the driver when entering the temporary stop intersection for each temporary stop intersection based on the intersection travel information received from the plural vehicles C. Subsequently, the unexpectedness prediction sensitivity determination apparatus 2 determines the unexpectedness prediction sensitivity of the driver when entering the temporary stop intersection based on the intersection travel information associated with the temporary stop intersections where determined standard driving operation levels of the driver are identical to one another (for example, "high").

According to such a configuration, for example, even though the standard driving operation level of the driver when entering the temporary stop intersection is changed for each intersection according to the visibility, the traffic volume or the like of the intersection, the driving operation of the driver when entering the temporary stop intersection is changed, and the minimum vehicle velocity Vmin included in the intersection travel information when entering the temporary stop intersection varies for each intersection, it is possible to reduce the variation of the minimum vehicle velocity Vmin used for determination of the unexpectedness prediction sensitivity of the driver. Thus, it is possible to improve determination accuracy of the unexpectedness prediction sensitivity of the driver when entering the temporary stop intersection.

(2) The unexpectedness prediction sensitivity determination apparatus 2 calculates the average value (intersection passage characteristic value average) VminAve of the minimum vehicle velocity Vmin for each temporary stop intersection based on the minimum vehicle velocity Vmin included in the intersection travel information received from the plural vehicles among the intersection travel information recorded in the intersection travel information recording unit 12. Subsequently, the unexpectedness prediction sensitivity determination apparatus 2 determines that as the calculated average value (intersection passage characteristic value average) VminAve of the minimum vehicle velocity Vmin is smaller, the standard driving operation level of the driver is higher.

According to such a configuration, for example, since the standard driving operation level of the driver when entering the temporary stop intersection is high, when the driver reduces the minimum vehicle velocity Vmin when entering the temporary stop intersection, it is possible to determine that the standard driving operation level of the driver is high. Thus, it is possible to determine the standard driving operation level of the driver when entering the temporary stop intersection with high accuracy.

(3) The unexpectedness prediction sensitivity determination apparatus 2 calculates the average value (vehicle-separated intersection passage characteristic value average) VminCAve of the intersection passage characteristic value Vmin for each vehicle C. Subsequently, the unexpectedness prediction sensitivity determination apparatus 2 calculates the average value (all vehicle intersection passage characteristic value average) Vth of the intersection passage characteristic value Vmin based on the intersection travel information received from the plural vehicles C. Subsequently, the unexpectedness prediction sensitivity determination apparatus 2 determines the unexpectedness prediction sensitivity of the driver when entering the temporary stop intersection, as the unexpectedness prediction sensitivity, based on the difference between the vehicle-separated intersection passage characteristic value average VminCAve and the all vehicle intersection passage characteristic value average Vth for each vehicle C.

According to such a configuration, for example, when the minimum vehicle velocity Vmin when entering the temporary stop intersection is large and the difference (VminCAve−Vth) between the vehicle-separated intersection passage characteristic value average VminCAve and the all vehicle intersection passage characteristic value average Vth is large, it is possible to determine that the unexpectedness prediction sensitivity of the driver is "low". Further, when the minimum vehicle velocity Vmin when entering the temporary stop intersection is small and the difference (VminCAve−Vth) between the vehicle-separated intersection passage characteristic value average VminCAve and the all vehicle intersection passage characteristic value average Vth is small (negative value), it is possible to determine that the unexpectedness prediction sensitivity of the driver is "high". Thus, it is possible to easily determine the unexpectedness prediction sensitivity of the driver when entering the temporary stop intersection.

(4) The unexpectedness prediction sensitivity determination apparatus 2 determines the unexpectedness prediction sensitivity of the driver when entering the temporary stop intersection based on the intersection travel information associated with the temporary stop intersection where the standard driving operation level of the driver when entering the temporary stop intersection is determined as being at the highest stage "high" among the intersection travel information.

According to such a configuration, the unexpectedness prediction sensitivity determination apparatus 2 determines the unexpectedness prediction sensitivity of the driver when entering the temporary stop intersection where the possibility of contact with another vehicle is at the highest stage "high". Thus, it is possible to determine the unexpectedness prediction sensitivity of the driver at the temporary stop intersection where the unexpectedness prediction sensitivity of the driver is relatively important.

Second Embodiment

Next, a second embodiment of the invention will be described with reference to the accompanying drawings.

The same reference numerals are given to the same components as in the above-described embodiment FIGS. 12A and 12B are diagrams illustrating an intersection passage characteristic value.

As shown in FIGS. 12A and 12B, the present embodiment is different from the first embodiment in that a vehicle velocity mark integration value P instead of the minimum vehicle velocity Vmin is employed as the intersection passage characteristic value. The vehicle velocity mark integration value P is a value obtained by the integration of a difference of a predetermined set vehicle velocity Vs (for example, 5 km/h) and an actual vehicle velocity V until the vehicle C enters the temporary stop intersection, and a traveling distance of the vehicle C at the actual vehicle velocity V. Thus, the present embodiment has a configuration in which the vehicle velocity mark integration value P is used for determination of the standard driving operation level of the driver when entering the temporary stop intersection and the unexpectedness prediction sensitivity.

Specifically, the present embodiment is different from the first embodiment in processing of steps S102 and S103 in FIG. 3 and steps S204 to S207 in FIG. 4.

In step S102, the controller 8 records time series data on the vehicle velocity V when traveling through the temporary stop intersection (target intersection) to which the vehicle C is determined as approaching in step S101 and time series data on a distance X from the vehicle C to the target intersection. Specifically, first, the controller 8 starts the recording of the time series data on the vehicle velocity V and the time series data on the distance X. A sampling time of the time series data is set to 10 ms, for example. Subsequently, the controller 8 determines whether or not the vehicle C finishes passage through the target intersection. Further, if it is determined that the vehicle C finishes the passage through the temporary stop intersection, the controller 8 terminates the recording of the time series data on the vehicle velocity V and the time series data on the distance X. On the other hand, if it is determined that the vehicle C does not finish the passage through the temporary stop intersection, the controller 8 executes the determination again.

In step S103, the controller 8 calculates the intersection passage characteristic value (vehicle velocity mark integration value) P based on the time series data on the vehicle velocity V and the time series data on the distance X recorded in step S102. Subsequently, the controller 8 generates intersection travel information including the calculated vehicle velocity mark integration value P, an intersection ID of the target intersection and a vehicle ID of the vehicle C. Specifically, the controller 8 calculates the vehicle velocity mark integration value P in a section where the vehicle velocity V is equal to or less than the set vehicle velocity Vs according to the following expression (1) based on the time series data on the vehicle velocity V and the time series data on the distance X recorded in step S102. Thus, the vehicle velocity mark integration value P increases as the traveling distance at a low velocity that is equal to or less than the set vehicle velocity Vs becomes long. Thus, the vehicle velocity mark integration value P serves as an evaluation index indicating a degree of caution of the driver when entering the temporary stop intersection.

$$P=\int\{Vs-V(x)\}dx \quad (1)$$

When the section where the vehicle velocity V is equal to or less than the set vehicle velocity Vs is not present among the time series data on the vehicle velocity V recorded in step S102, the controller 8 calculates the vehicle velocity mark integration value P according to the following expression (2). Thus, the vehicle velocity mark integration value P becomes a negative value.

$$P=Vs-V\mathrm{min} \quad (2)$$

On the other hand, in step S204, the temporary stop intersection standard driving operation level determining unit 13*a* calculates an average value (intersection passage characteristic value average) PAve of the intersection passage characteristic value P for each temporary stop intersection based on the intersection travel information received from the plural vehicles C among the intersection travel information extracted in step S203. Thus, the temporary stop intersection standard driving operation level determining unit 13*a* calculates the intersection passage characteristic value average PAve with respect to all the temporary stop intersections.

FIG. 13 is a diagram illustrating the relationship between the intersection passage characteristic value average and the standard driving operation level of the driver.

In step S205, the temporary stop intersection standard driving operation level determining unit 13*a* determines the standard driving operation level of the driver when entering the temporary stop intersection for each temporary stop intersection based on the intersection passage characteristic value average PAve calculated in step S204. Specifically, as shown in FIG. 6, the temporary stop intersection standard driving operation level determining unit 13*a* initializes the variable j to 0 (step S401). Subsequently, the temporary stop intersection standard driving operation level determining unit 13*a* adds 1 to the variable j (step S402). Subsequently, the temporary stop intersection standard driving operation level determining unit 13*a* selects the intersection passage characteristic value average PAve corresponding to the temporary stop intersection whose intersection ID is equal to the variable j from among the calculated intersection passage characteristic value average PAve (step S403).

Subsequently, the temporary stop intersection standard driving operation level determining unit 13*a* determines the standard driving operation level of the driver when entering the temporary stop intersection whose intersection ID is equal to the variable j based on the selected intersection passage characteristic value average Pave (step S404). Specifically, as shown in FIG. 13, if the selected intersection passage characteristic value average PAve is equal to or less than 0 km/h·m, the temporary stop intersection standard driving operation level determining unit 13*a* determines that the standard driving operation level of the driver when entering the temporary stop intersection whose intersection ID is equal to the variable j is "low". On the other hand, if the selected intersection passage characteristic value average PAve is equal to or greater than 0 km/h·m and less than 5 km/h·m, the temporary stop intersection standard driving operation level determining unit 13*a* determines that the standard driving operation level of the driver when entering the temporary stop intersection whose intersection ID is equal to the variable j is "intermediate". Further, if the selected intersection passage characteristic value average PAve is equal to or greater than 5 km/h·m, the temporary stop intersection standard driving operation level determining unit 13*a* determines that the standard driving operation level of the driver when entering the temporary stop intersection whose intersection ID is equal to the variable j is "high" (step S404).

Thus, the temporary stop intersection standard driving operation level determining unit 13*a* determines that as the intersection passage characteristic value average PAve is larger, the standard driving operation level of the driver when entering the temporary stop intersection is higher. That is, at the temporary stop intersection where the visibility is poor, the vehicle velocity V becomes low (equal to or lower than the set vehicle velocity Vs) at a relatively long distance before the intersection. Accordingly, if the intersection passage characteristic value average PminAve is a large value, it is determined that the standard driving operation level of the driver when entering the temporary stop intersection is "high". On the other hand, at the temporary stop intersection where the visibility is good, the vehicle velocity V becomes low only at a relatively short distance before the intersection. Accordingly, if the intersection passage characteristic value average PminAve is a small value, it is determined that the standard driving operation level of the driver when entering the temporary stop intersection is "low". Further, the temporary stop intersection standard driving operation level determining unit 13*a* repeats the flow (steps S402 to S404) until the variable j becomes equal to or greater than the total number of the intersections (step S405). Thus, the temporary stop intersection standard driving operation level determining unit 13*a* determines the standard driving operation level of the driver when entering the temporary stop intersection with respect to all the temporary stop intersections.

In step S206, the standard driving operation level-separated driver characteristic determining unit 13*b* selects intersection travel information associated with the temporary stop intersection where standard driving operation level of the driver determined in step S205 is "high", from among the intersection travel information extracted in step S203. Subsequently, the standard driving operation level-separated driver characteristic determining unit 13*b* calculates an average value (vehicle-separated intersection passage characteristic value average) PCAve of the intersection passage characteristic value P for each vehicle C based on the selected intersection travel information. Thus, the standard driving operation level-separated driver characteristic determining unit 13b calculates the vehicle-separated intersection passage characteristic value average PCAve with respect to all the vehicles C.

In step S207, the unexpectedness prediction sensitivity determining unit 16 determines the unexpectedness prediction sensitivity of the driver when entering the temporary stop intersection for each vehicle C based on the intersection travel information extracted in step S203 and the standard driving operation level of the driver determined in step S205. Specifically, as shown in FIG. 9, the unexpectedness prediction sensitivity determining unit 14 selects intersection travel information associated with the temporary stop intersection where standard driving operation level of the driver determined in step S205 is "high" from among the intersection travel information extracted in step S203 (step S601). Subsequently, the unexpectedness prediction sensitivity determining unit 14 calculates an average value (an all vehicle intersection passage characteristic value average) Pth of the intersection passage characteristic value P included in the selected intersection travel information and a standard deviation (an unexpectedness prediction sensitivity determination threshold value) σth of the intersection passage characteristic value P (step S602). Subsequently, the unexpectedness prediction sensitivity determining unit 14 determines the unexpectedness prediction sensitivity of the driver when entering the temporary stop intersection for each vehicle C based on the difference between the calculated all vehicle intersection passage characteristic value average Pth and the vehicle-separated intersection passage characteristic value average PCAve calculated in step S206. Specifically, first, the unexpectedness prediction sensitivity determining unit 14 initializes the variable 1 to 0 (step S603). Subsequently, the unexpectedness prediction sensitivity determining unit 14 adds 1 to the variable 1 (step S604).

Figure 14:
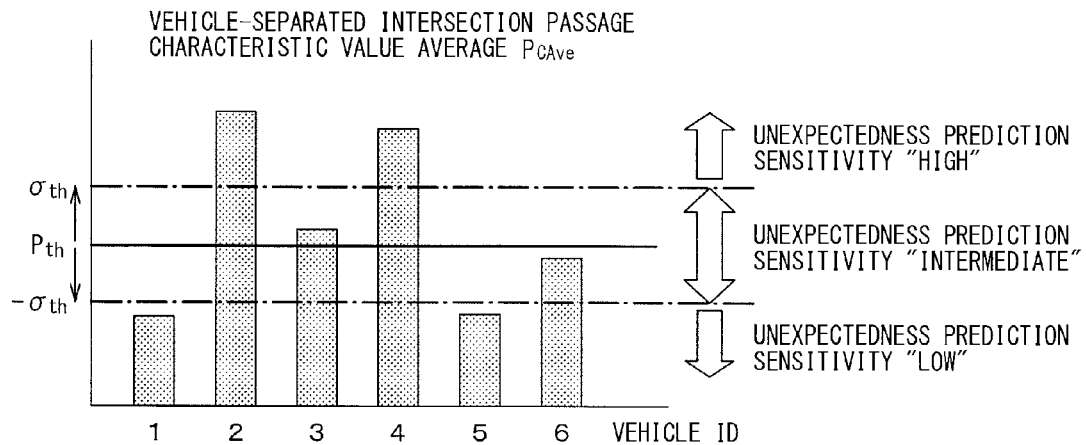
FIG. 14 is a diagram illustrating the relationship between a vehicle-separated intersection passage characteristic value average and an unexpectedness prediction sensitivity.

FIG. 14 is a diagram the relationship between the vehicle-separated intersection passage characteristic value average and the unexpectedness prediction sensitivity.

Subsequently, the unexpectedness prediction sensitivity determining unit 14 selects the vehicle-separated intersection passage characteristic value average PCAve of vehicle whose vehicle ID is equal to the variable 1 from among the calculated vehicle-separated intersection passage characteristic value average PCAve (step S605). Subsequently, the unexpectedness prediction sensitivity determining unit 14 determines the unexpectedness prediction sensitivity of the driver of the vehicle C whose vehicle ID is equal to the variable 1 when entering the temporary stop intersection based on the subtraction result obtained by subtracting the all vehicle intersection passage characteristic value average Pth from the selected vehicle-separated intersection passage characteristic value average PCAve (step S606).

Specifically, as shown in FIG. 14, if the subtraction result is equal to or greater than the unexpectedness prediction sensitivity determination threshold value σth, the unexpectedness prediction sensitivity determining unit 14 determines that the unexpectedness prediction sensitivity of the driver of the vehicle C whose vehicle ID is equal to the variable 1 when entering the temporary stop intersection is "high". On the other hand, if the subtraction result is less than the unexpectedness prediction sensitivity determination threshold value σth and is equal to or greater than the sign-inverted threshold value (−σth), the unexpectedness prediction sensitivity determining unit 14 determines that the unexpectedness prediction sensitivity of the driver of the vehicle C whose vehicle ID is equal to the variable 1 when entering the temporary stop intersection is "intermediate". Here, the sign-inverted threshold value (−σth) represents a numerical value obtained by multiplying the unexpectedness prediction sensitivity determination threshold value σth by "−1". Further, if the subtraction result is smaller than the sign-inverted threshold value (−σth), the unexpectedness prediction sensitivity determining unit 14 determines that the unexpectedness prediction sensitivity of the driver of the vehicle C whose vehicle ID is equal to the variable 1 when entering the temporary stop intersection is "low" (step S606). Thus, the unexpectedness prediction sensitivity determining unit 14 determines that as the subtraction result (PCAve−Pth) is larger, the unexpectedness prediction sensitivity of the driver when entering the temporary stop intersection is higher.

That is, a vehicle having a small average value of the vehicle velocity mark integration value P travels a short distance at a low speed, and thus, a possibility of approaching another vehicle or a pedestrian when entering the temporary stop intersection is high. Accordingly, if the subtraction result (PCAve−Pth) is a small value, it is determined that the unexpectedness prediction sensitivity of the driver when entering the temporary stop intersection is "low". On the other hand, a vehicle having a large average value of the vehicle velocity mark integration value P travels a long distance at a low speed, and thus, a possibility of approaching another vehicle or a pedestrian when entering the temporary stop intersection is low. Accordingly, if the subtraction result (PCAve−Pth) is a large value, it is determined that the unexpectedness prediction sensitivity of the driver when entering the temporary stop intersection is "high". Further, the unexpectedness prediction sensitivity determining unit 14 repeats the flow (step S604 to S606) until the variable 1 becomes equal to or greater than the total number of the vehicles (step S607). Thus, the unexpectedness prediction sensitivity determining unit 14 determines the unexpectedness prediction sensitivity of the driver when entering the temporary stop intersection with respect to all the vehicles C.

In the present embodiment, the temporary stop intersection standard driving operation level determining unit 13a in FIG. 1 and step S204 in FIG. 4 form an average value calculating unit. Similarly, the temporary stop intersection standard driving operation level determining unit 13a in FIG. 1 and step S205 in FIG. 4 form a standard driving operation level determination executing unit. Further, the standard driving operation level-separated driver characteristic determining unit 13b in FIG. 1 and step S206 in FIG. 4 form a vehicle-separated travel state average value calculating unit. Further, the all vehicle intersection passage characteristic value average Pth forms a plural-vehicle travel state average value. Further, the unexpectedness prediction sensitivity determining unit 14 in FIG. 1 and step S207 in FIG. 4 form a plural-vehicle travel state average value calculating unit and an unexpectedness prediction sensitivity determination executing unit.

Effects of the Present Embodiment

The present embodiment shows the following effects in addition to the effects of (1) to (4) in the first embodiment.

(1) The unexpectedness prediction sensitivity determination apparatus 2 calculates the average value (vehicle velocity mark integration value average value) PAve of the vehicle velocity mark integration value P for each temporary stop intersection based on the vehicle velocity mark integration value P included in the intersection travel information received from the plural vehicles among the intersection travel information recorded in the intersection travel information recording unit 12. The unexpectedness prediction sensitivity determination apparatus 2 determines that the standard driving operation level of the driver is higher as the average value (vehicle velocity mark integration value average value) PAve of the calculated vehicle velocity mark integration value P is higher.

According to such a configuration, for example, since the standard driving operation level of the driver when entering the temporary stop intersection is high, when the distance where the driver travels at the low speed equal to or less than the set vehicle velocity Vs increases and the vehicle velocity mark integration value P increases, it is possible to determine that the standard driving operation level of the driver is high. Thus, it is possible to determine the standard driving operation level of the driver with high accuracy.

Third Embodiment

Next, a third embodiment of the invention will be described with reference to the accompanying drawings.

The same reference numerals are given to the same components as in the above-described embodiments.

The present embodiment is different from the first and second embodiments in that the minimum vehicle velocity Vmin is employed as the intersection passage characteristic value and a statistic indicating a variation degree of the intersection passage characteristic value (minimum value) Vmin is used for determination of the standard driving operation level of the driver and the unexpectedness prediction sensitivity. In the present embodiment, the standard deviation is employed as the statistic indicating the variation degree.

Figure 15:
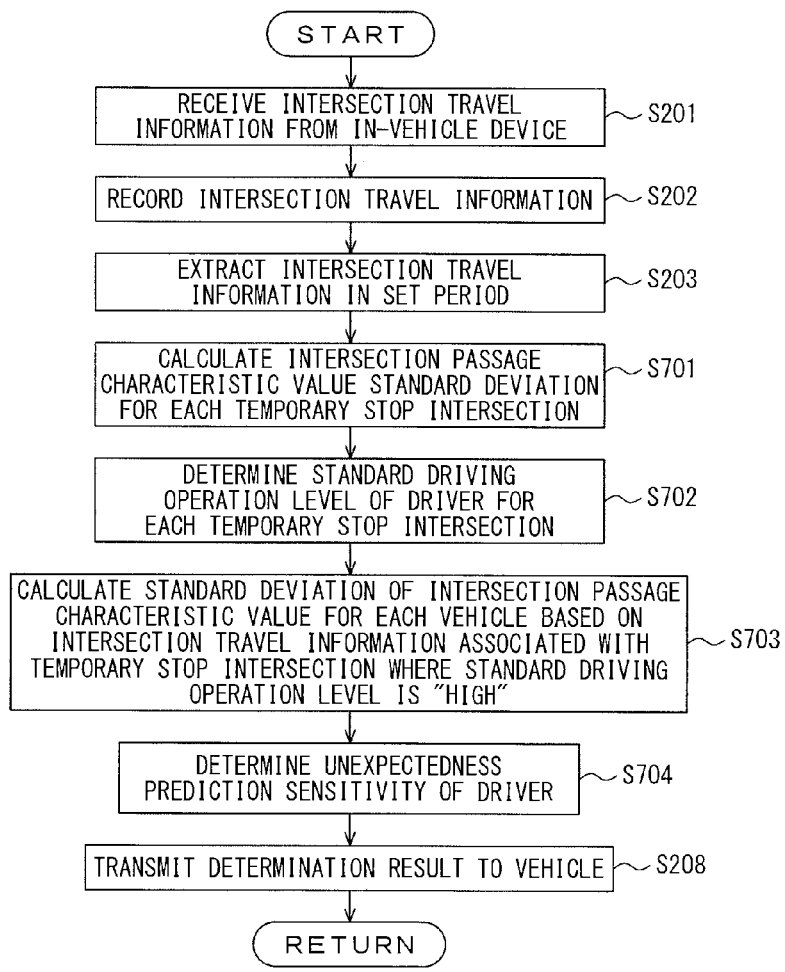
FIG. 15 is a flowchart illustrating an unexpectedness prediction sensitivity determination process.
Figures 16, 17:
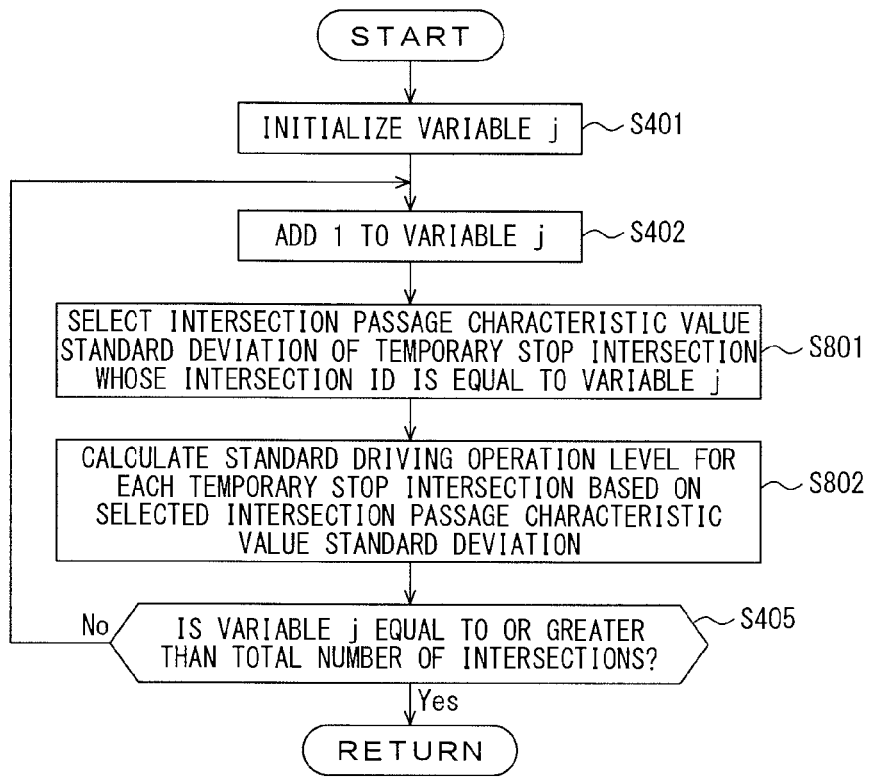
FIG. 16 is a flowchart illustrating details of a process executed in step S205.
FIG. 17 is a diagram illustrating the relationship between an intersection passage characteristic value standard deviation and a standard driving operation level of a driver.

FIG. 15 is a flowchart illustrating an unexpectedness prediction sensitivity determination process. FIG. 16 is a flowchart illustrating details of the process executed in step S205.

Specifically, in the present embodiment, steps S701 to S704 in FIG. 15 are used instead of steps S204 to S207 in FIG. 4 in the first embodiment, and steps S801 and S802 in FIG. 16 are used instead of steps S403 and S404 in FIG. 6.

In step S701, the temporary stop intersection standard driving operation level determining unit 13a calculates a standard deviation (hereinafter, also referred to as an intersection passage characteristic value standard deviation) Vσ of the intersection passage characteristic value for each temporary stop intersection based on the intersection travel information received from the plural vehicles C among the intersection travel information extracted in step S203. Thus, the temporary stop intersection standard driving operation level determining unit 13a calculates the intersection passage characteristic value standard deviation Vσ with respect to all the temporary stop intersections.

FIG. 17 is a diagram illustrating the relationship between the intersection passage characteristic value standard deviation and the standard driving operation level of the driver.

In step S702, the temporary stop intersection standard driving operation level determining unit 13a determines the standard driving operation level of the driver when entering the temporary stop intersection for each temporary stop intersection based on the intersection passage characteristic value standard deviation Vσ calculated in step S701. Specifically, as shown in FIG. 16, the temporary stop intersection standard driving operation level determining unit 13a initializes the variable j to 0 (step S401). Subsequently, the temporary stop intersection standard driving operation level determining unit 13a adds 1 to the variable j (step S402). Subsequently, the temporary stop intersection standard driving operation level determining unit 13a selects the intersection passage characteristic value standard deviation Vσ corresponding to the temporary stop intersection whose intersection ID is equal to the variable j from among the calculated intersection passage characteristic value standard deviation Vσ (step S801). Subsequently, the temporary stop intersection standard driving operation level determining unit 13a determines the standard driving operation level of the driver when entering the temporary stop intersection whose intersection ID is equal to the variable j based on the selected intersection passage characteristic value standard deviation Vσ.

Specifically, as shown in FIG. 17, if the selected intersection passage characteristic value standard deviation Vσ is equal to or greater than 0 km/h and less than V1 km/h, the temporary stop intersection standard driving operation level determining unit 13a determines that the standard driving operation level of the driver when entering the temporary stop intersection whose intersection ID is equal to the variable j is "low". On the other hand, if the selected intersection passage characteristic value standard deviation Vσ is equal to or greater than V1 km/h and less than V2 (>V1) km/h, the temporary stop intersection standard driving operation level determining unit 13a determines that the standard driving operation level of the driver when entering the temporary stop intersection whose intersection ID is equal to the variable j is "intermediate". Further, if the selected intersection passage characteristic value standard deviation Vσ is equal to or greater than V2 km/h, the temporary stop intersection standard driving operation level determining unit 13a determines that the standard driving operation level of the driver when entering the temporary stop intersection whose intersection ID is equal to the variable j is "high" (step S802).

That is, at the intersection where road situations are frequently changed, the variation of the minimum vehicle velocity Vmin becomes a large value. Accordingly, if the intersection passage characteristic value standard deviation Vσ is a large value, it is determined that the standard driving operation level of the driver when entering the temporary stop intersection is "high". On the other hand, at the intersection where road situations are not frequently changed, the variation of the minimum vehicle velocity Vmin becomes a small value. Accordingly, if the intersection passage characteristic value standard deviation Vσ is a small value, it is determined that the standard driving operation level of the driver when entering the temporary stop intersection is "low". Further, the temporary stop intersection standard driving operation level determining unit 13a repeats the flow (steps S402, S801 and S802) until the variable j becomes equal to or greater than the total number of the intersections (step S405). Thus, the temporary stop intersection standard driving operation level determining unit 13a determines the standard driving operation level of the driver with respect to all the temporary stop intersections.

In step S703, the standard driving operation level-separated driver characteristic determining unit 13b selects intersection travel information associated with the temporary stop intersection where standard driving operation level of the driver determined in step S702 is "high", from among the intersection travel information extracted in step S203. Subsequently, the standard driving operation level-separated driver characteristic determining unit 13b calculates a standard deviation (hereinafter, also referred to as a vehicle-separated intersection passage characteristic value standard deviation) VminCσ of the intersection passage characteristic value Vmin for each vehicle C based on the selected intersection travel information. Thus, the standard driving operation level-separated driver characteristic determining unit 13b calculates the vehicle-separated intersection passage characteristic value standard deviation VminCσ with respect to all the vehicles C.

In step S704, the unexpectedness prediction sensitivity determining unit 16 determines the unexpectedness prediction sensitivity of the driver when entering the temporary stop intersection for each vehicle C based on intersection travel information extracted in step S203 and the standard driving operation level of the driver determined in step S702. Specifically, as shown in FIG. 9, the unexpectedness prediction sensitivity determining unit 14 selects intersection travel information associated with the temporary stop intersection where standard driving operation level of the driver determined in step S702 is "high" from among the intersection travel information extracted in step S203 (step S601). Subsequently, the unexpectedness prediction sensitivity determining unit 14 calculates a standard deviation (hereinafter, also referred to as an all vehicle intersection passage characteristic value standard deviation) Vth of the intersection passage characteristic value Vmin included in the selected intersection travel information and the unexpectedness prediction sensitivity determination threshold value σth (for example, 0.2×Vth) (step S602). Subsequently, the unexpectedness prediction sensitivity determining unit 14 determines the unexpectedness prediction sensitivity of the driver when entering the temporary stop intersection for each vehicle C based on the difference between the calculated all vehicle intersection passage characteristic value standard deviation Vth and the vehicle-separated intersection passage characteristic value standard deviation VminCσ calculated in step S703. Specifically, the unexpectedness prediction sensitivity determining unit 14 first initializes the variable 1 to 0 (step S603). Subsequently, the unexpectedness prediction sensitivity determining unit 14 adds 1 to the variable 1 (step S604).

FIG. 18 is a diagram illustrating the relationship between the vehicle-separated intersection passage characteristic value standard deviation and the unexpectedness prediction sensitivity.

Subsequently, the unexpectedness prediction sensitivity determining unit 14 selects the vehicle-separated intersection passage characteristic value standard deviation VminCσ of the vehicle whose vehicle ID is equal to the variable 1, from among the calculated vehicle-separated intersection passage characteristic value standard deviation VminCσ (step S605). Subsequently, the unexpectedness prediction sensitivity determining unit 14 determines the unexpectedness prediction sensitivity of the driver of the vehicle C whose vehicle ID is equal to the variable 1 when entering the temporary stop intersection based on the subtraction result obtained by subtracting the all vehicle intersection passage characteristic value standard deviation Vth from the selected vehicle-separated intersection passage characteristic value standard deviation VminCσ (step S606). Specifically, as shown in FIG. 18, if the subtraction result is equal to or greater than the unexpectedness prediction sensitivity determination threshold value σth, the unexpectedness prediction sensitivity determining unit 14 determines that the unexpectedness prediction sensitivity of the driver of the vehicle C whose vehicle ID is equal to the variable 1 when entering the temporary stop intersection is "low". On the other hand, if the subtraction result is less than the unexpectedness prediction sensitivity determination threshold value σth and is equal to or greater than the sign-inverted threshold value (−σth), the unexpectedness prediction sensitivity determining unit 14 determines that the unexpectedness prediction sensitivity of the driver of the vehicle C whose vehicle ID is equal to the variable 1 when entering the temporary stop intersection is "intermediate". Here, the sign-inverted threshold value (−σth) represents a numerical value obtained by multiplying the unexpectedness prediction sensitivity determination threshold value σth by "−1". Further, if the subtraction result is less than the sign-inverted threshold value (−σth), the unexpectedness prediction sensitivity determining unit 14 determines that the unexpectedness prediction sensitivity of the driver of the vehicle C whose vehicle ID is equal to the variable 1 when entering the temporary stop intersection is "high" (step S606).

Thus, the unexpectedness prediction sensitivity determining unit 14 determines that as the subtraction result (VminCσ−Vth) is smaller, the unexpectedness prediction sensitivity of the driver when entering the temporary stop intersection is higher. That is, with respect to a vehicle having a large variation of the minimum vehicle velocity Vmin when entering the temporary stop intersection, it is possible to determine that the driver's skill is low. Accordingly, if the subtraction result (VminCσ−Vth) is a large value, it is determined that the unexpectedness prediction sensitivity of the driver when entering the temporary stop intersection is "low". On the other hand, with respect to a vehicle having a small variation of the minimum vehicle velocity Vmin when entering the temporary stop intersection, it is possible to determine that the driver's skill is high. Accordingly, if the subtraction result (VminCσ−Vth) is a small value, it is determined that the unexpectedness prediction sensitivity of the driver when entering the temporary stop intersection is "high". Further, the unexpectedness prediction sensitivity determining unit 14 repeats the flow (step S604 to S606) until the variable 1 becomes equal to or greater than the total number of the vehicles (step S607). Thus, the unexpectedness prediction sensitivity determining unit 14 determines the unexpectedness prediction sensitivity of the driver when entering the temporary stop intersection with respect to all the vehicles C.

In the present embodiment, the vehicle-separated intersection passage characteristic value standard deviation VminCσ forms a vehicle-separated statistic. Similarly, the standard driving operation level-separated driver characteristic determining unit 13b in FIG. 1 and step S703 in FIG. 15 form a vehicle-separated statistic calculating unit. Further, the all vehicle intersection passage characteristic value standard deviation Vth forms a plural-vehicle statistic. Further, the unexpectedness prediction sensitivity determining unit 14 in FIG. 1 and step S704 in FIG. 15 form a plural-vehicle statistic calculating unit and an unexpectedness prediction sensitivity determination executing unit.

Effects of the Present Embodiment

The present embodiment shows the following effects in addition to the effects of (1) to (4) in the first embodiment.

(1) The unexpectedness prediction sensitivity determination apparatus 2 calculates the standard deviation (the vehicle-separated intersection passage characteristic value standard deviation) VminCσ of the intersection passage characteristic value Vmin for each vehicle C. Further, the unexpectedness prediction sensitivity determination apparatus 2 calculates the standard deviation (the all vehicle intersection passage characteristic value standard deviation) Vth of the intersection passage characteristic value Vmin based on the intersection travel information received from the plural vehicles C. Subsequently, the unexpectedness prediction sensitivity determination apparatus 2 determines the unexpectedness prediction sensitivity of the driver when entering the temporary stop intersection based on the difference between the vehicle-separated intersection passage characteristic value standard deviation VminCσ and the all vehicle intersection passage characteristic value standard deviation Vth.

According to such a configuration, for example, when the variation of the minimum vehicle velocity Vmin when entering the temporary stop intersection is large and the difference (VminCσ−Vth) between the vehicle-separated intersection passage characteristic value standard deviation VminCσ and the all vehicle intersection passage characteristic value standard deviation Vth is large, it is possible to determine that the unexpectedness prediction sensitivity of the driver is "low". Further, when the variation of the minimum vehicle velocity Vmin when entering the temporary stop intersection is small and the difference (VminCσ−Vth) between the vehicle-separated intersection passage characteristic value standard deviation VminCσ and the all vehicle intersection passage characteristic value standard deviation Vth is small (negative value), it is possible to determine that the unexpectedness prediction sensitivity of the driver is "high". Thus, it is possible to easily determine the unexpectedness prediction sensitivity of the driver when entering the temporary stop intersection.

Fourth Embodiment

Next, a fourth embodiment of the invention will be described with reference to the accompanying drawings.

The same reference numerals are given to the same components as in the above-described embodiments.

The present embodiment is different from the third embodiment in that the vehicle velocity mark integration value P is employed as the intersection passage characteristic value and the statistic indicating the variation degree of the intersection passage characteristic value (vehicle velocity mark integration value) P is used for determination of the standard driving operation level of the driver and the unexpectedness prediction sensitivity. In the present embodiment, the standard deviation is employed as the statistic indicating the variation degree.

Specifically, the present embodiment is different from the third embodiment in the processing of steps S701 to S704 in FIG. 15 and steps S801 and S802 in FIG. 16.

In step S701, the temporary stop intersection standard driving operation level determining unit 13a calculates a standard deviation (an intersection passage characteristic value standard deviation) Pσ of the intersection passage characteristic value for each temporary stop intersection based on the intersection travel information received from the plural vehicles C among the intersection travel information extracted in step S203. Thus, the temporary stop intersection standard driving operation level determining unit 13a calculates the intersection passage characteristic value standard deviation Pσ with respect to all the temporary stop intersections.

FIG. 19 is a diagram illustrating the relationship between the intersection passage characteristic value standard deviation and the standard driving operation level of the driver.

In step S702, the temporary stop intersection standard driving operation level determining unit 13a determines the standard driving operation level of the driver when entering the temporary stop intersection for each temporary stop intersection based on the intersection passage characteristic value standard deviation Pσ calculated in step S701. Specifically, as shown in FIG. 16, the temporary stop intersection standard driving operation level determining unit 13a initializes the variable j to 0 (step S401). Subsequently, the temporary stop intersection standard driving operation level determining unit 13a adds 1 to the variable j (step S402). Subsequently, the temporary stop intersection standard driving operation level determining unit 13a selects the intersection passage characteristic value standard deviation Pσ corresponding to the temporary stop intersection whose intersection ID is equal to the variable j from among the calculated intersection passage characteristic value standard deviation Pσ (step S801). Subsequently, the temporary stop intersection standard driving operation level determining unit 13a determines the standard driving operation level of the driver when entering the temporary stop intersection whose intersection ID is equal to the variable j based on the selected intersection passage characteristic value standard deviation Pσ.

Specifically, as shown in FIG. 19, if the selected intersection passage characteristic value standard deviation Pa is equal to or greater than 0 km/h·m and less than P1 km/h·m, the temporary stop intersection standard driving operation level determining unit 13a determines that the standard driving operation level of the driver when entering the temporary stop intersection whose intersection ID is equal to the variable j is "high". On the other hand, if the selected intersection passage characteristic value standard deviation Pa is equal to or greater than P1 km/h·m and smaller than P2 (>P1) km/h·m, the temporary stop intersection standard driving operation level determining unit 13a determines that the standard driving operation level of the driver when entering the temporary stop intersection whose intersection ID is equal to the variable j is "intermediate". Further, if the selected intersection passage characteristic value standard deviation Pσ is equal to or greater than P2 km/h·m, the temporary stop intersection standard driving operation level determining unit 13a determines that the standard driving operation level of the driver when entering the temporary stop intersection whose intersection ID is equal to the variable j is "low" (step S802).

Thus, the temporary stop intersection standard driving operation level determining unit 13a determines that as the intersection passage characteristic value standard deviation Pσ is larger, the standard driving operation level of the driver when entering the temporary stop intersection is higher. That is, at the intersection where road situations are frequently changed, the variation of the vehicle velocity mark integration value P becomes a large value. Accordingly, if the intersection passage characteristic value standard deviation Pσ is a large value, it is determined that the standard driving operation level of the driver when entering the temporary stop intersection is "high". On the other hand, at the intersection where road situations are not frequently changed, the variation of the vehicle velocity mark integration value P becomes a small value. Accordingly, if the intersection passage characteristic value standard deviation Pσ is a small value, it is determined that the standard driving operation level of the driver when entering the temporary stop intersection is "low". Further, the temporary stop intersection standard driving operation level determining unit 13a repeats the flow (steps S402, S801 and S802) until the variable j becomes equal to or greater than the total number of the intersections (step S405). Thus, the temporary stop intersection standard driving operation level determining unit 13a determines the standard driving operation level of the driver when entering the temporary stop intersection with respect to all the temporary stop intersections.

In step S703, the standard driving operation level-separated driver characteristic determining unit 13b selects intersection travel information associated with the temporary stop intersection where standard driving operation level of the driver determined in step S702 is "high", from among the intersection travel information extracted in step S203. Subsequently, the standard driving operation level-separated driver characteristic determining unit 13b calculates a standard deviation (hereinafter, also referred to as a vehicle-separated intersection passage characteristic value standard deviation) PCσ of the intersection passage characteristic value P for each vehicle C based on the selected intersection travel information. Thus, the standard driving operation level-separated driver characteristic determining unit 13b calculates the vehicle-separated intersection passage characteristic value standard deviation PCσ with respect to all the vehicles C.

In step S704, the unexpectedness prediction sensitivity determining unit 16 determines the unexpectedness prediction sensitivity of the driver when entering the temporary stop intersection for each vehicle C based on the intersection travel information extracted in step S203 and the standard driving operation level of the driver determined in step S702. Specifically, as shown in FIG. 9, the unexpectedness prediction sensitivity determining unit 14 selects intersection travel information associated with the temporary stop intersection where standard driving operation level of the driver determined in step S702 is "high" from among the intersection travel information extracted in step S203 (step S601). Subsequently, the unexpectedness prediction sensitivity determining unit 14 calculates the standard deviation (all vehicle intersection passage characteristic value standard deviation) Pth of the intersection passage characteristic value P included in the selected intersection travel information and the unexpectedness prediction sensitivity determination threshold value σth (for example, 0.2×Pth) (step S602). Subsequently, the unexpectedness prediction sensitivity determining unit 14 determines the unexpectedness prediction sensitivity of the driver when entering the temporary stop intersection for each vehicle C based on the difference between the calculated all vehicle intersection passage characteristic value standard deviation Pth and the vehicle-separated intersection passage characteristic value standard deviation PCσ calculated in step S206. Specifically, the unexpectedness prediction sensitivity determining unit 14 initializes the variable 1 to 0 (step S603). Subsequently, the unexpectedness prediction sensitivity determining unit 14 adds 1 to the variable 1 (step S604).

FIG. 20 is a diagram illustrating the relationship between the vehicle-separated intersection passage characteristic value standard deviation and the unexpectedness prediction sensitivity.

Subsequently, the unexpectedness prediction sensitivity determining unit 14 selects the vehicle-separated intersection passage characteristic value standard deviation PCσ of the vehicle whose vehicle ID is equal to the variable 1, from among the calculated vehicle-separated intersection passage characteristic value standard deviation PCσ (step S605). Subsequently, the unexpectedness prediction sensitivity determining unit 14 determines the unexpectedness prediction sensitivity of the driver of the vehicle C whose vehicle ID is equal to the variable 1 when entering the temporary stop intersection based on the subtraction result obtained by subtracting the all vehicle intersection passage characteristic value standard deviation Pth from the selected vehicle-separated intersection passage characteristic value standard deviation PCσ (step S606). Specifically, as shown in FIG. 20, if the subtraction result is equal to or greater than the unexpectedness prediction sensitivity determination threshold value σth, the unexpectedness prediction sensitivity determining unit 14 determines that the unexpectedness prediction sensitivity of the driver of the vehicle C whose vehicle ID is equal to the variable 1 when entering the temporary stop intersection is "low". On the other hand, if the subtraction result is less than the unexpectedness prediction sensitivity determination threshold value σth and is equal to or greater than the sign-inverted threshold value (−σth), the unexpectedness prediction sensitivity determining unit 14 determines that the unexpectedness prediction sensitivity of the driver of the vehicle C whose vehicle ID is equal to the variable 1 when entering the temporary stop intersection is "intermediate". Here, the sign-inverted threshold value (−σth) represents a numerical value obtained by multiplying the unexpectedness prediction sensitivity determination threshold value σth by "−1". Further, if the subtraction result is less than the sign-inverted threshold value (−σth), the unexpectedness prediction sensitivity determining unit 14 determines that the unexpectedness prediction sensitivity of the driver of the vehicle C whose vehicle ID is equal to the variable 1 when entering the temporary stop intersection is "high" (step S606).

Thus, the unexpectedness prediction sensitivity determining unit 14 determines that as the subtraction result (PCσ−Pth) is smaller, the unexpectedness prediction sensitivity of the driver when entering the temporary stop intersection is higher. That is, with respect to a vehicle having a large variation of the vehicle velocity mark integration value P, it is possible to determine that the driver's skill is low. Accordingly, if the subtraction result (PCσ−Pth) is a large value, it is determined that the unexpectedness prediction sensitivity of the driver when entering the temporary stop intersection is "low". On the other hand, with respect to a vehicle having a small variation of the vehicle velocity mark integration value P, it is possible to determine that the driver's skill is high. Accordingly, if the subtraction result (PCσ−Pth) is a small value, it is determined that the unexpectedness prediction sensitivity of the driver when entering the temporary stop intersection is "high". Further, the unexpectedness prediction sensitivity determining unit 14 repeats the flow (step S604 to S606) until the variable 1 becomes equal to or greater than the total number of the vehicles (step S607). Thus, the unexpectedness prediction sensitivity determining unit 14 determines the unexpectedness prediction sensitivity of the driver when entering the temporary stop intersection with respect to all the vehicles C.

In the present embodiment, the vehicle-separated intersection passage characteristic value standard deviation PCσ forms a vehicle-separated statistic.

Similarly, the standard driving operation level-separated driver characteristic determining unit 13b in FIG. 1 and step S703 in FIG. 15 form a vehicle-separated statistic calculating unit. Further, the all vehicle intersection passage characteristic value standard deviation Pth forms a plural-vehicle statistic. Further, the unexpectedness prediction sensitivity determining unit 14 in FIG. 1 and step S704 in FIG. 15 form a plural-vehicle statistic calculating unit and an unexpectedness prediction sensitivity determination executing unit.

Effects of the Present Embodiment (1) The unexpectedness prediction sensitivity determination apparatus 2 calculates the standard deviation (the vehicle-separated intersection passage characteristic value standard deviation) PCσ of the intersection passage characteristic value P for each vehicle C. Further, the unexpectedness prediction sensitivity determination apparatus 2 calculates the standard deviation (the all vehicle intersection passage characteristic value standard deviation) Pth of the intersection passage characteristic value P based on the intersection travel information received from the plural vehicles C. Subsequently, the unexpectedness prediction sensitivity determination apparatus 2 determines the unexpectedness prediction sensitivity of the driver when entering the temporary stop intersection as the unexpectedness prediction sensitivity based on the difference between the vehicle-separated intersection passage characteristic value standard deviation PCσ and the all vehicle intersection passage characteristic value standard deviation Pth.

According to such a configuration, for example, when the variation of the vehicle velocity mark integration value P when entering the temporary stop intersection is large and the difference (PCσ−Pth) between the vehicle-separated intersection passage characteristic value standard deviation PCσ and the all vehicle intersection passage characteristic value standard deviation Pth is large, it is possible to determine that the unexpectedness prediction sensitivity of the driver is "low". Further, when the variation of the vehicle velocity mark integration value P when entering the temporary stop intersection is small and the difference (PCσ−Pth) between the vehicle-separated intersection passage characteristic value standard deviation PCσ and the all vehicle intersection passage characteristic value standard deviation Pth is small (negative value), it is possible to determine that the unexpectedness prediction sensitivity of the driver is "high". Thus, it is possible to easily determine the unexpectedness prediction sensitivity of the driver when entering the temporary stop intersection.

Modification Examples

In the above-described first to fourth embodiments, an example of the combination of the determination method of the standard driving operation level of the driver when entering the temporary stop intersection and the determination method of the unexpectedness prediction sensitivity of the driver when entering the temporary stop intersection is shown, but a different combination may be used. For example, a combination configuration of the determination method of the standard driving operation level of the driver when entering the temporary stop intersection and the determination method of the unexpectedness prediction sensitivity of the driver when entering the temporary stop intersection, described in the different embodiments, may be used.

Hereinbefore, the invention is described with reference to the limited number of embodiments, but the scope of the invention is not limited thereto, and modifications of the respective embodiments based on the above description will be obvious to those skilled in the art.

The invention claimed is:

1. An unexpectedness prediction sensitivity determination apparatus comprising:
   a receiving unit configured to receive, from a vehicle, intersection travel information that includes a travel state amount indicating a travel state of the vehicle when entering a temporary stop intersection, and associates the travel state amount with the temporary stop intersection where the travel state amount is obtained;
   an intersection travel information recording unit configured to record the intersection travel information received by the receiving unit;
   a standard driving operation level determining unit configured to determine, for each of temporary stop intersections, a standard driving operation level of a driver when entering the each of temporary stop intersections, based on plural-vehicle intersection travel information that is the intersection travel information received from a plurality of vehicles among the intersection travel information recorded in the intersection travel information recording unit; and
   an unexpectedness prediction sensitivity determining unit configured to determine an unexpectedness prediction sensitivity of the driver when entering the temporary stop intersection based on associated intersection travel information that is the intersection travel information associated with the temporary stop intersections where the standard driving operation levels determined by the standard driving operation level determining unit are identical to one another, among the intersection travel information recorded in the intersection travel information recording unit.

2. The unexpectedness prediction sensitivity determination apparatus according to claim 1,
   wherein the intersection travel information includes a minimum vehicle velocity when entering the temporary stop intersection, and
   wherein the standard driving operation level determining unit includes:
      an average value calculating unit configured to calculate an average value of the minimum vehicle velocity for the each of temporary stop intersections based on the minimum vehicle velocity included in the plural-vehicle intersection travel information, and
      a standard driving operation level determination executing unit configured to determine that as the average value calculated by the average value calculating unit is smaller, the standard driving operation level is higher.

3. The unexpectedness prediction sensitivity determination apparatus according to claim 1,
   wherein the intersection travel information includes an integration value of a difference between a predetermined set vehicle velocity and an actual vehicle velocity when entering the temporary stop intersection, and a traveling distance of the vehicle at the actual vehicle velocity, and
   wherein the standard driving operation level determining unit includes:
      an average value calculating unit configured to calculate an average value of the integration value for the each of temporary stop intersections based on the integration value included in the plural-vehicle intersection travel information, and
      a standard driving operation level determination executing unit configured to determine that as the average value calculated by the average value calculating unit is larger, the standard driving operation level is higher.

4. The unexpectedness prediction sensitivity determination apparatus according to claim 1,
   wherein the unexpectedness prediction sensitivity determining unit includes:
      a vehicle-separated travel state average value calculating unit configured to calculate a vehicle-separated travel state average value that is an average value of the travel state amount for each of the plurality of vehicles based on the associated intersection travel information,
      a plural-vehicle travel state average value calculating unit configured to calculate a plural-vehicle travel state average value that is an average value of the travel state amounts based on the intersection travel information received from the plurality of vehicles among the associated intersection travel information, and
      an unexpectedness prediction sensitivity determination executing unit configured to determine the unexpectedness prediction sensitivity of the driver when entering the temporary stop intersection based on a difference between the vehicle-separated travel state average value calculated by the vehicle-separated travel state average value calculating unit and the plural-vehicle travel state average value calculated by the plural-vehicle travel state average value calculating unit.

5. The unexpectedness prediction sensitivity determination apparatus according to claim 1,
   wherein the unexpectedness prediction sensitivity determining unit includes:
   a vehicle-separated statistic calculating unit configured to calculate a vehicle-separated statistic that is a statistic indicating a variation degree of the travel state amount for each of the plurality of vehicles based on the associated intersection travel information,
   a plural-vehicle statistic calculating unit configured to calculate a plural-vehicle statistic that is a statistic indicating a variation degree of the travel state amounts based on the intersection travel information received from the plurality of vehicles among the associated intersection travel information, and
   an unexpectedness prediction sensitivity determination executing unit configured to determine the unexpectedness prediction sensitivity of the driver when entering the temporary stop intersection based on a difference between the vehicle-separated statistic calculated by the vehicle-separated statistic calculating unit and the plural-vehicle statistic calculated by the plural-vehicle statistic calculating unit.

6. The unexpectedness prediction sensitivity determination apparatus according to claim 1,
   wherein the associated intersection travel information is the intersection travel information associated with the temporary stop intersection where the standard driving operation level is determined to be at a highest stage by the standard driving operation level determining unit, among the intersection travel information recorded in the intersection travel information recording unit.

7. An unexpectedness prediction sensitivity determination apparatus comprising:
   a receiving means for receiving, from a vehicle, intersection travel information that includes a travel state amount indicating a travel state of the vehicle when entering a temporary stop intersection, and associates the travel state amount with the temporary stop intersection where the travel state amount is obtained;
   an intersection travel information recording means for recording the intersection travel information received by the receiving means;
   a standard driving operation level determining means for determining, for each of temporary stop intersections, a standard driving operation level of a driver when entering the each of temporary stop intersections, based on plural-vehicle intersection travel information that is the intersection travel information received from a plurality of vehicles among the intersection travel information recorded by the intersection travel information recording means; and
   an unexpectedness prediction sensitivity determining means for determines an unexpectedness prediction sensitivity of the driver when entering the temporary stop intersection based on associated intersection travel information that is the intersection travel information associated with the temporary stop intersections where the standard driving operation levels determined by the standard driving operation level determining means are identical to one another, among the intersection travel information recorded by the intersection travel information recording means.

8. An unexpectedness prediction sensitivity determination method comprising:
   receiving, from a vehicle, intersection travel information that includes a travel state amount indicating a travel state of the vehicle when entering a temporary stop intersection, and associates the travel state amount with the temporary stop intersection where the travel state amount is obtained;
   recording the received intersection travel information in an intersection travel information recording unit;
   determining, for each of temporary stop intersections, a standard driving operation level of a driver when entering the each of temporary stop intersections, based on plural-vehicle intersection travel information that is the intersection travel information received from a plurality of vehicles among the intersection travel information recorded in the intersection travel information recording unit; and
   determining an unexpectedness prediction sensitivity of the driver when entering the temporary stop intersection based on associated intersection travel information that is the intersection travel information associated with the temporary stop intersections where the standard driving operation levels are identical to one another, among the intersection travel information recorded in the intersection travel information recording unit.

* * * * *